(12) United States Patent
Liu et al.

(10) Patent No.: US 12,495,177 B1
(45) Date of Patent: Dec. 9, 2025

(54) SYSTEM AND METHOD FOR CONTROLLING ADULT DEVICES BASED ON FULL-SCENARIO APPLICATIONS

(71) Applicant: HYTTO PTE. LTD, Singapore (SG)

(72) Inventors: Dan Liu, Singapore (SG); Jilin Qiu, Singapore (SG)

(73) Assignee: HYTTO PTE. LTD., Singapore (SG)

(*) Notice: Subject to any disclaimer, the term of this patent is extended or adjusted under 35 U.S.C. 154(b) by 0 days.

(21) Appl. No.: 18/884,639

(22) Filed: Sep. 13, 2024

(51) Int. Cl.
| | |
|---|---|
| H04N 21/41 | (2011.01) |
| A61H 19/00 | (2006.01) |
| G06V 10/94 | (2022.01) |
| G06V 20/40 | (2022.01) |
| H04N 21/44 | (2011.01) |
| G06V 10/62 | (2022.01) |

(52) U.S. Cl.
CPC ......... H04N 21/4104 (2013.01); A61H 19/50 (2013.01); G06V 10/945 (2022.01); G06V 20/46 (2022.01); H04N 21/44008 (2013.01); G06V 10/62 (2022.01)

(58) Field of Classification Search
CPC ........ A61H 19/00; A61H 19/30; A61H 19/32; A61H 19/34; A61H 19/40; A61H 19/44; A61H 19/50; H04N 21/4104; H04N 21/44008; G06V 20/46; G06V 20/945; G06V 20/62
See application file for complete search history.

(56) References Cited

U.S. PATENT DOCUMENTS

| | | |
|---|---|---|
| 10,685,488 B1 | 6/2020 | Kumar |
| 11,992,450 B2 | 5/2024 | Kuncewicz |
| 2021/0209934 A1* | 7/2021 | Siles ................ G06F 9/452 |
| 2023/0359425 A1 | 11/2023 | Iglesias |

* cited by examiner

*Primary Examiner* — Carrie R Dorna
(74) *Attorney, Agent, or Firm* — Keefe IP Law, PLLC

(57) ABSTRACT

A method is disclosed. The method includes monitoring, by a monitoring module of a first application, multimedia information provided by at least one second application of multiple different types, wherein the multimedia information includes at least one of the multimedia information captured by a device, the multimedia information received by the device, and the multimedia information displayed on the device. The at least one second application is configured to provide different types of sexual entertainment-related content. The method also includes identifying, by an identification module, the sexual entertainment-related content in the multimedia information, generating, by a generation module, a control signal according to the sexual entertainment-related content, and transmitting, by a transmission module of the first application, the control signal to a sexual stimulation device.

22 Claims, 13 Drawing Sheets

SYSTEM AND METHOD FOR CONTROLLING ADULT DEVICES BASED ON FULL-SCENARIO APPLICATIONS

FIELD OF THE INVENTION

The present disclosure generally relates to a system and method for controlling adult devices, and more particularly to a system and method for controlling adult devices based on full-scenario applications.

BACKGROUND OF THE INVENTION

Artificial intelligence (AI) is currently employed in the use of adult devices such as adult toys to sexually stimulate users. For example, in browser-based video streaming, AI technology can control toys to perform actions based on relevant content within the video. AI technology may facilitate control of adult toys based on certain features recognized in videos such as explicit sexual content.

However, conventional systems utilizing AI technology primarily focus on singular scenarios such as a single content (e.g., a single video) and thereby fail to fully meet diverse user utilization. For example, the ability of a conventional system to recommend videos within a browser is typically no longer suitable to meet comprehensive utilization desired by users.

For example, conventional AI systems used in controlling adult devices typically utilize an application scenario (e.g., a basic video stream) that is relatively singular. These conventional systems do not account for or leverage the increasing amount of varied information and data sources that users encounter on a daily basis.

As one example, issued U.S. Pat. No. 11,992,450 to Kuncewicz (the '450 patent) discloses a system for driving an electronic device based on a video feed. However, the '450 patent, as best understood, merely discloses synchronizing the operation of an electronic device with a video feed, with the electronic device being controlled based on a singular source.

Accordingly, a need in the art exists for an efficient and convenient technique to meet increasingly diverse and complex desires of users for utilizing AI in controlling adult toys in view of an increasing amount of multiple information and data sources such as devices that users encounter and/or utilize in their daily lives.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method. The method includes monitoring, by a monitoring module of a first application, multimedia information provided by at least one second application of multiple different types, wherein the multimedia information includes at least one of the multimedia information captured by a device, the multimedia information received by the device, and the multimedia information displayed on the device. The at least one second application is configured to provide different types of sexual entertainment-related content. The at least one second application includes at least one selected from the group of a video/audio playback type, a camera-shooting type, an audio-recording type, a game-play type, an instant communication type, or a web browsing type. The method also includes identifying, by an identification module, the sexual entertainment-related content in the multimedia information, generating, by a generation module, a control signal according to the sexual entertainment-related content, and transmitting, by a transmission module of the first application, the control signal to a sexual stimulation device. The first application is configured to run separately with the at least one second application on a same device or to be integrated with the at least one second application.

In another aspect, the present disclosure is directed to a system. The system includes a monitoring module, an identification module, a generation module, and a transmission module, the modules comprising computer-executable code stored in non-volatile memory, and a memory for storing instructions and a processor for executing the instructions. The computer-executable code, when operating on the processor, causes the system to: monitor, by the monitoring module of a first application, multimedia information provided by at least one second application of multiple different types, wherein the multimedia information includes at least one of the multimedia information captured by a device, the multimedia information received by the device, and the multimedia information displayed on the device. The at least one second application is configured to provide different types of sexual entertainment-related content. The at least one second application includes at least one selected from the group of a video/audio playback type, a camera-shooting type, an audio-recording type, a game-play type, an instant communication type, or a web browsing type. The computer-executable code, when operating on the processor, also causes the system to: identify, by the identification module, the sexual entertainment-related content in the multimedia information, generate, by the generation module, a control signal according to the sexual entertainment-related content, and transmit, by the transmission module of the first application, the control signal to a sexual stimulation device. The first application is configured to run separately with the at least one second application on a same device or to be integrated with the at least one second application.

DETAILED DESCRIPTION AND INDUSTRIAL APPLICABILITY

Figure 1:
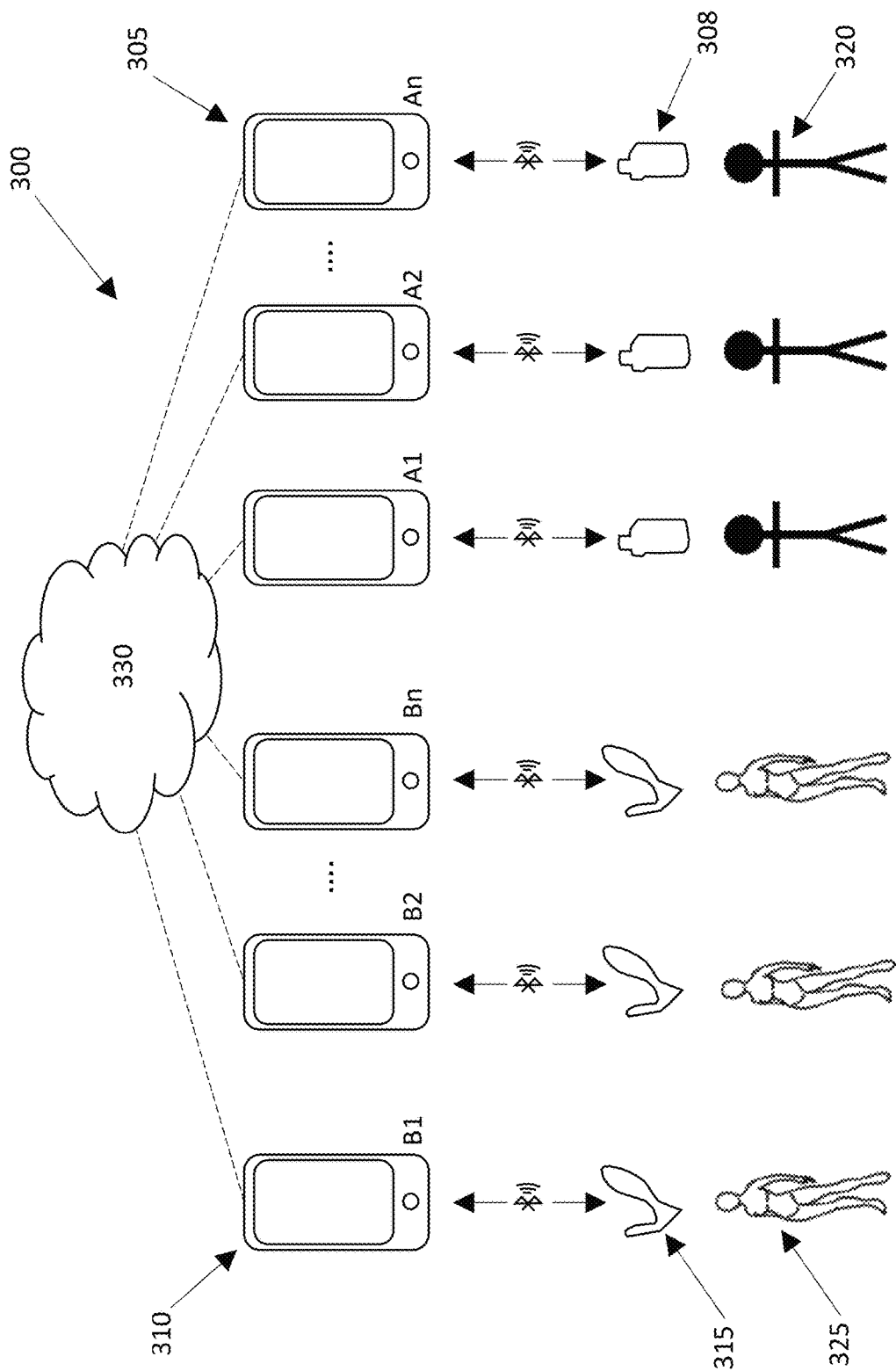
FIG. 1 is a schematic illustration of an exemplary system of the present invention.

FIG. 1 illustrates an exemplary system 300 for controlling adult devices based on full-scenario applications. System 300 may allow for artificial intelligence (AI) functionalities across any suitable software and/or applications (e.g., including third-party applications), for example without prior integration with third-party software's interfaces and/or pre-adaptation. System 300 may thereby substantially achieve full-scenario (e.g., multi-type application) AI capabilities and generate control signals for adult toys for example as described further below. System 300 may be adaptable to any suitable type of application, may provide a relatively simple technique to implement AI functions, may provide an increased number or amount of application scenarios, and/or may provide for efficient implementation of iterative updates of AI functions.

As illustrated in FIG. 1, system 300 may include one or more male user devices 305, one or more female user devices 310, one or more male accessories 308, and one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315.

System 300 may include any desired number of male user devices 305 (e.g., A1, A2, . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 15 and 16). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
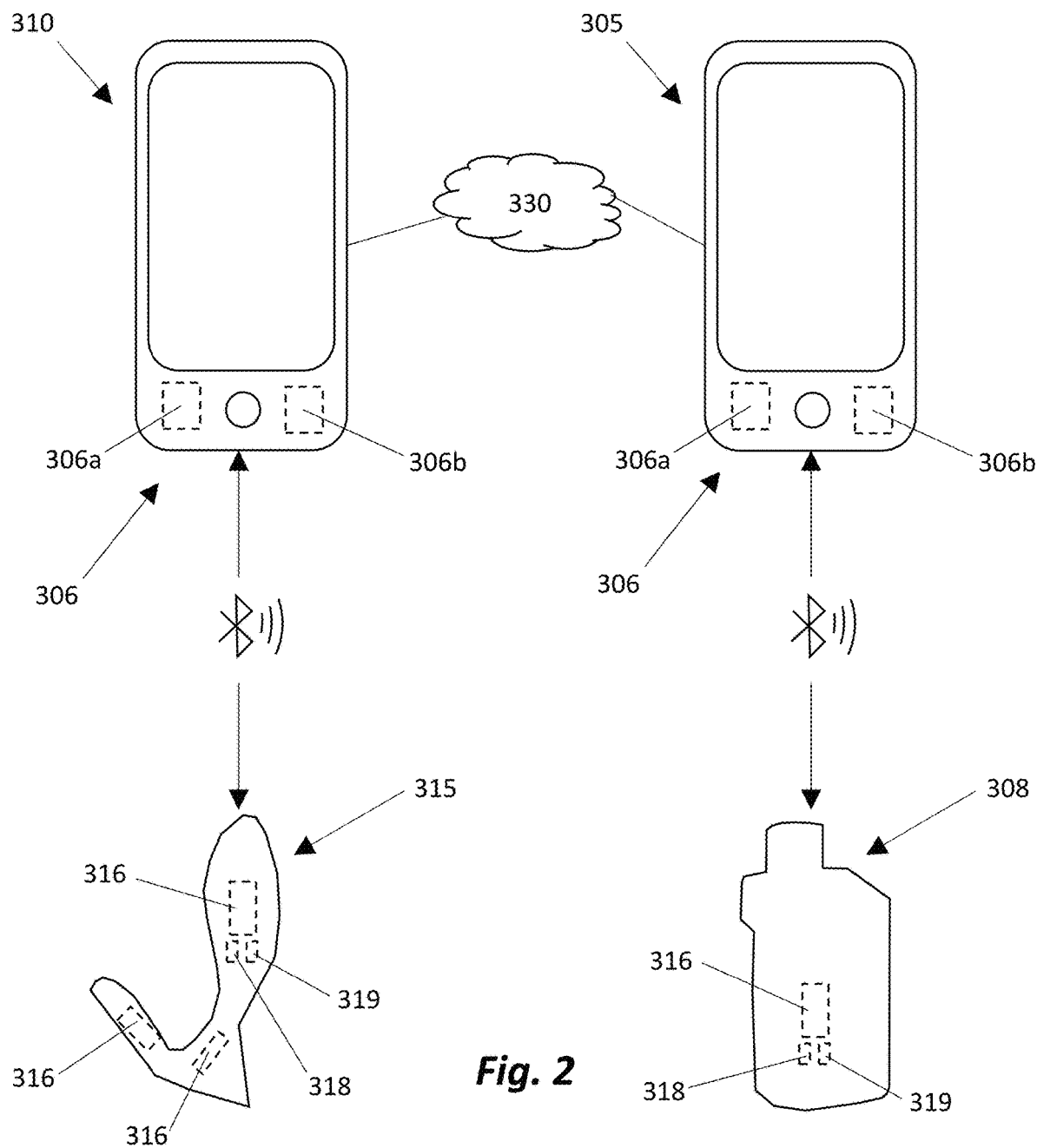
FIG. 2 is schematic illustration of an exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306a and a movement sensor 306b. Location sensor 306a may include a GPS device, a Galileo device, a GLONASS device, an IRNSS device, a BeiDou device, and/or any other suitable device that may operate with a global navigation system.

Movement sensor 306b may include any suitable components for sensing motion (e.g., motion amplitude), velocity, and/or acceleration. Movement sensor 306b may include an acceleration sensor. Movement sensor 306b may include a gyroscope. For example, movement sensor 306b may include a displacement sensor, a velocity sensor, and/or an accelerometer. For example, movement sensor 306b may include components such as a servo accelerometer, a piezo-electric accelerometer, a potentiometric accelerometer, and/or a strain gauge accelerometer. Movement sensor 306b may include a piezoelectric velocity sensor or any other suitable type of velocity or acceleration sensor.

Returning to FIG. 1, system 300 may include any desired number of female user devices 310 (e.g., B1, B2, . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310 or any other suitable imaging device). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated by a given female user 325 and with a respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 (e.g., and/or any other suitable imaging device) is recording a video or pictures of female user 325. For example, female user 325 may be an erotic model using female accessory 315 that may be an erotic device, or a user using female accessory 315 that may be a tool or work device specific to a desired application.

As illustrated in FIG. 2, female accessory 315 may include one or more driving components such as one or more motors 316. Motor 316 may include an electric motor. Motor 316 may include a server motor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 15. Controller 319 may include for example a processor (e.g., micro-processing logic control device) or board components. Controller 319 may control one or more motors 316 based on input data and/or commands (e.g., control commands) received from male user device 305 and/or female user device 310 via network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, motor 316 may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from female accessory 315. For example, motor 316 may cause a temperature variation of female accessory 315.

Male accessory 308 may include components generally similar to female accessory 315 and may operate generally similarly to female accessory 315. Male accessory 308 may be a sexual stimulation device that may be associated with a given male user 320 (e.g., a viewer of one or more female users 325 and/or male users 320, or a male model) and respective male user device 305 (e.g., a viewer device) of that given male user 320. Male accessory 308 may be a ring, wand, massager, stroker, and/or any other desired device.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electromechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 16. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via WiFi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

Figure 3:
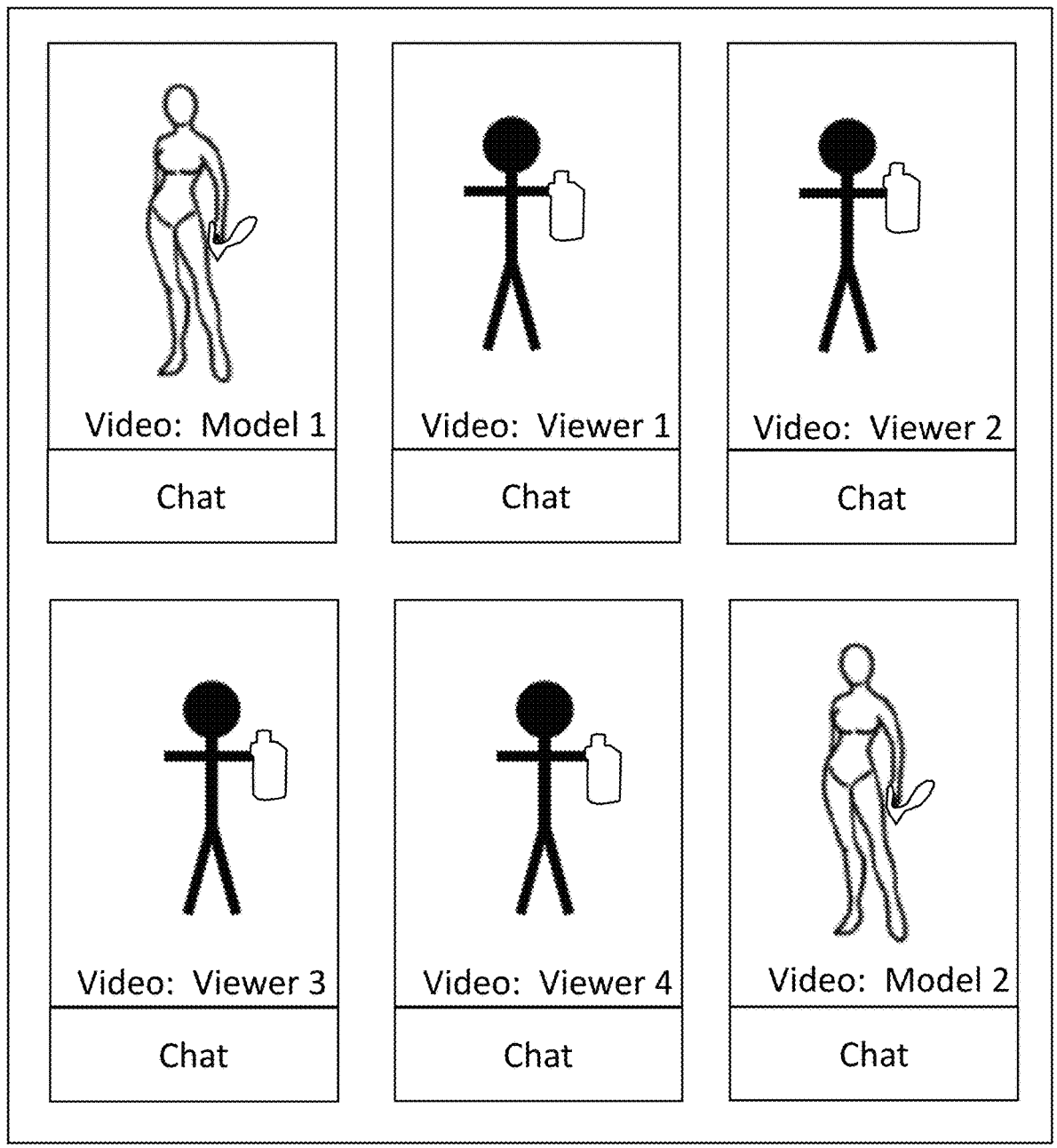
FIG. 3 is a schematic illustration of an exemplary embodiment of the exemplary disclosed system.

As illustrated in FIG. 3, one or more exemplary disclosed modules as further described below may provide a chat room interface (e.g., chat application) via one or more male user devices 305 and/or one or more female user devices 310 for use by male users 320 and female users 325. For example, video display of one or more female users 325, one or more male users 320, and/or and a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 or to female user 325 via female user device 310.

Figure 4:
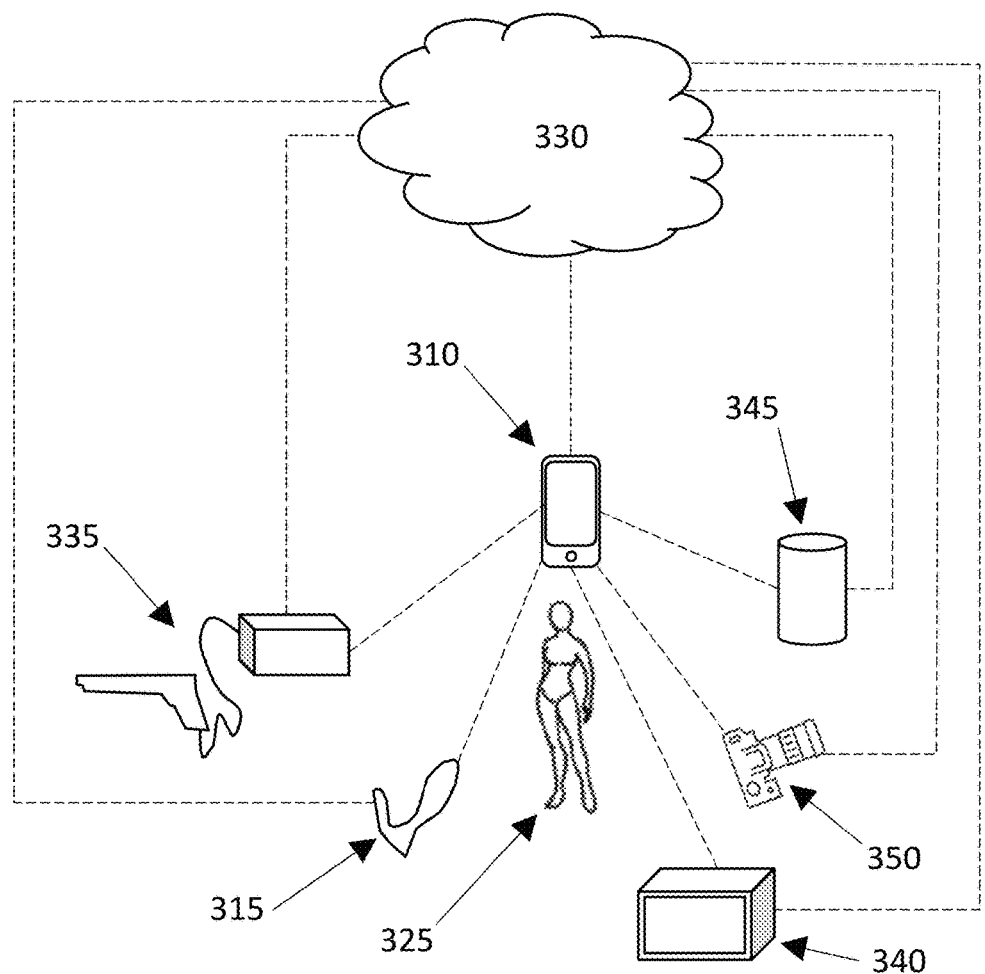
FIG. 4 is a schematic illustration of an exemplary embodiment of the exemplary disclosed system.

FIG. 4 illustrates an exemplary embodiment of system 300 including different exemplary devices that may communicate directly with the exemplary disclosed user device (e.g., male user device 305, female user device 310, female accessory 315, and/or male accessory 308) and/or with each other via network 330. The exemplary disclosed devices may include a gaming system 335, a display system 340, an audio system 345, an imaging device 350, and/or any other suitable devices and/or systems for providing the exemplary disclosed second application described below.

Gaming system 335 may be a video game system, a gambling system (e.g., casino game), and/or any other suitable system for providing game play. Display system 340 may be a television, a projector, and/or any other suitable system for providing images to be viewed by users. Audio system 345 may be a radio, a sound system, a stereo, and/or any other suitable system for providing audio (e.g., music or sound) to users. Any other suitable devices may also be used such as, for example, strobe lights, light show devices, teleprompters, karaoke machines, hologram devices, and/or any other desired entertainment or information system. In at least some exemplary embodiments, the exemplary disclosed systems illustrated for example in FIG. 4 may provide the exemplary disclosed multimedia information associated with the exemplary disclosed second application disclosed herein.

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

System 300 may include one or modules for performing the exemplary disclosed operations such as, for example, the exemplary disclosed monitoring module, identification module, generation module, transmission module, extraction module, and/or calculation module for example as described below. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 15 and 16. For example, the exemplary disclosed buffer storage may include components similar to the exemplary storage medium and RAM described below regarding FIG. 15. The exemplary disclosed buffer storage may be implemented in software and/or a fixed memory location in hardware of system 300. The exemplary disclosed buffer storage (e.g., a data buffer) may store data temporarily during an operation of system 300.

Figure 5:
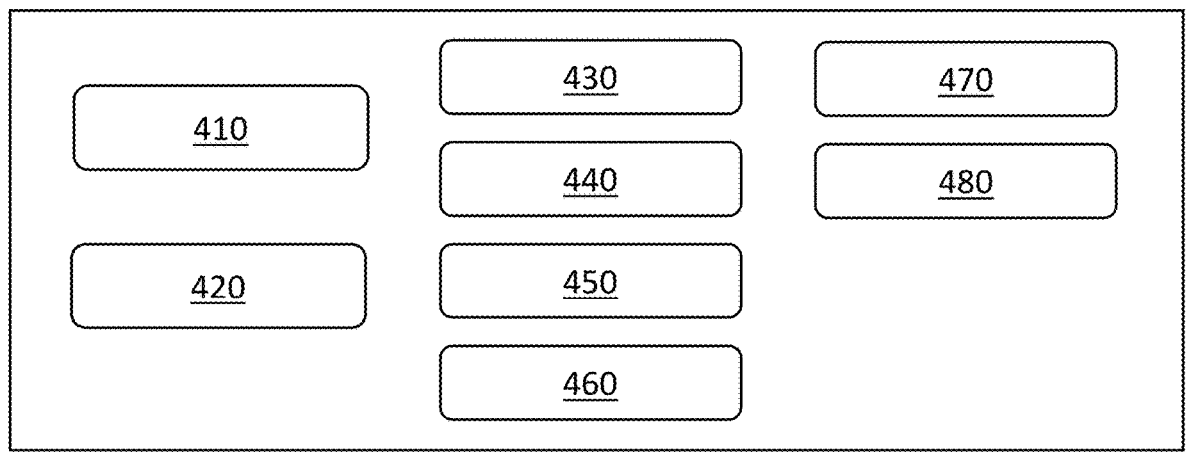
FIG. 5 is a schematic illustration of an exemplary embodiment of the exemplary disclosed system.

FIG. 5 illustrates an exemplary embodiment of system 300 including exemplary applications and modules that may be utilized with system 300. For example, system 300 may include a first application 410 and a second application 420, which are further described below. System 300 may also include a monitoring module 430, an identification module 440, a generation module 450, and a transmission module 460, which are further described below. In at least some exemplary embodiments, first application 410 may include monitoring module 430. Second application 420 may include and/or be associated with the exemplary disclosed multimedia information disclosed for example herein, which may be associated with the exemplary disclosed devices of FIG. 4 and/or any other suitable devices.

In at least some exemplary embodiments, the exemplary disclosed system and method may include monitoring, by monitoring module 430 of first application 410, the exemplary disclosed multimedia information provided by at least one second application 420 of multiple different types (e.g., multimedia information that may be associated with, for example, the exemplary disclosed devices of FIG. 4). Second application 420 may be the same application as first application 410, with second application 420 performing a different function (e.g., as described herein) than monitoring module 430 of first application 410. For example, second application 420 may encompass one or more of a game module, a browser module, a camera module, a video call module, and/or any other suitable module of first application 410. Also for example, second application 420 and first application 410 may be different applications. Second application 420 may encompass one or more of a game application, a browser application, a camera application, a video call application, and/or any other suitable application (e.g., an application associated with the exemplary disclosed devices of FIG. 4).

In at least some exemplary embodiments, the exemplary disclosed multimedia information may include at least one of the multimedia information captured by a device such as, for example, gaming system 335, display system 340, audio system 345, imaging device 350, and/or any other suitable device. For example, based on the exemplary disclosed multimedia information, second application 420 may serve as multiple different applications (e.g., a full-scenario application). For example, the exemplary disclosed multimedia information may include images captured by an imaging device (e.g., imaging device 350) such as a webcam or thumb camera, and either displayed or not displayed on a display screen (e.g., a screen of male user device 305, female user device 310, gaming system 335, display system 340, and/or any other device having a display screen). For example, the exemplary disclosed multimedia information may include images that may be captured by an imaging device and displayed on a display screen, and/or images that may be captured by an imaging device and not displayed on a display screen. The exemplary disclosed multimedia information may include multimedia information received by a device such as, for example, video data received by display system 340 that may be a television, projector, and/or any other suitable type of display device. The exemplary disclosed multimedia information may include multimedia information that may be displayed on a device such as, for example, videos and/or images displayed on male user device 305, female user device 310, gaming system 335, display system 340, and/or any other suitable device (e.g., a mobile phone or a computer screen). The exemplary disclosed multimedia information may also include sound or noise associated with audio system 345, male user device 305, female user device 310, gaming system 335, display system 340, and/or any other suitable device.

In at least some exemplary embodiments, second applications 420 of different types may be configured to provide any desired sexual content (e.g., different types of sexual entertainment-related content). The exemplary disclosed sexual entertainment-related content may include more than videos and/or images containing naked bodies (e.g., naked human bodies). For example, in addition to or alternatively to including videos and/or images containing naked bodies, the exemplary disclosed sexual entertainment-related content may include human expressions and movements (e.g., of male user 320 and/or female user 325 that may be imaged by imaging device 350 or of other users), and/or sex toys such as male accessory 308 and/or female accessory 315. The exemplary disclosed sexual entertainment-related content may include text such as, for example, chats between lovers, pornographic novels and other erotic literature, and/or any other desired textual information. The exemplary disclosed sexual entertainment-related content may include control patterns (e.g., curves) such as, for example, a control pattern of sex toys such as male accessory 308 and/or female accessory 315, and/or a spectrum curve of sound or music (e.g., a curve associated with a beat, tempo, volume, and/or any other suitable characteristics of music or sound). For example, the exemplary disclosed sexual entertainment-related content may include the curve of musical drum beats.

One or more second applications 420 that may include and/or be associated with the exemplary disclosed multimedia information (e.g., which may be associated with the exemplary disclosed devices of FIG. 4 and/or any other suitable devices) may be second applications of different types. For example, second applications 420 may include a video/audio playback type (e.g., video playback type and/or audio playback type), a video type, a game-play type (e.g., a video game type), a camera-shooting type, an audio-recording type, an instant communication type (e.g., an instant messaging type), a web browsing type, an audio playback type, and/or any other suitable type or types.

Monitoring module 430 may be a part of first application 410. Monitoring module 430 may include similar components to the exemplary disclosed modules described above. Monitoring module 430 may monitor the exemplary disclosed multimedia information described above. For example, monitoring module 430 may monitor multimedia information provided by (e.g., generated by and/or associated with) one or more second applications 420 for example of the exemplary disclosed types and/or associated with the exemplary disclosed devices described above.

Identification module 440 may include similar components to the exemplary disclosed modules described above. Identification module 440 may identify the exemplary disclosed sexual entertainment-related content in the exemplary disclosed multimedia information. For example, identification module 440 may use optical character recognition for example as described above, match spatial data and/or other data to predetermined data (e.g., predetermined shapes, colors, text, contours, and other features), utilize artificial intelligence operations for example as described herein, identify patterns and/or predetermined criteria of image data and/or audio data, and/or utilize any other suitable technique for identifying the exemplary disclosed sexual entertainment-related content. In at least some exemplary embodiments, identification module 440 may identify the exemplary disclosed sexual entertainment-related content using identification selection boxes for example as described below.

Generation module 450 may include similar components to the exemplary disclosed modules described above. Generation module 450 may generate a control signal according to (e.g., based on) the exemplary disclosed sexual entertainment-related content. For example, generation module 450 may generate any suitable control signal for controlling the exemplary disclosed adult devices (e.g., one or more male accessories 308 and/or one or more female accessories 315). For example, generation module 450 may generate control signals that control the exemplary disclosed adult devices based on characteristics of the exemplary disclosed sexual entertainment-related content of the exemplary disclosed multimedia information for example as described below.

Transmission module 460 may include similar components to the exemplary disclosed modules described above. Transmission module 460 may transmit the exemplary disclosed control signals generated by generation module 450 to the exemplary disclosed adult devices (e.g., one or more male accessories 308 and/or one or more female accessories 315) via the exemplary disclosed communication techniques described herein. For example, transmission module 460 may provide for transmission of the exemplary disclosed control signals from communication components of the exemplary disclosed devices (e.g., devices of FIG. 4) to communication device 318 of the exemplary disclosed adult devices. Respective controllers 319 of the exemplary disclosed adult devices (e.g., one or more male accessories 308 and/or one or more female accessories 315) may then control the adult devices based on the exemplary disclosed control signals transmitted based on an operation of transmission module 460. In at least some exemplary embodiments, first application 410 may include transmission module 460. System 300 may also include an extraction module 470 and a calculation module 480, which are described further below.

Figure 6:
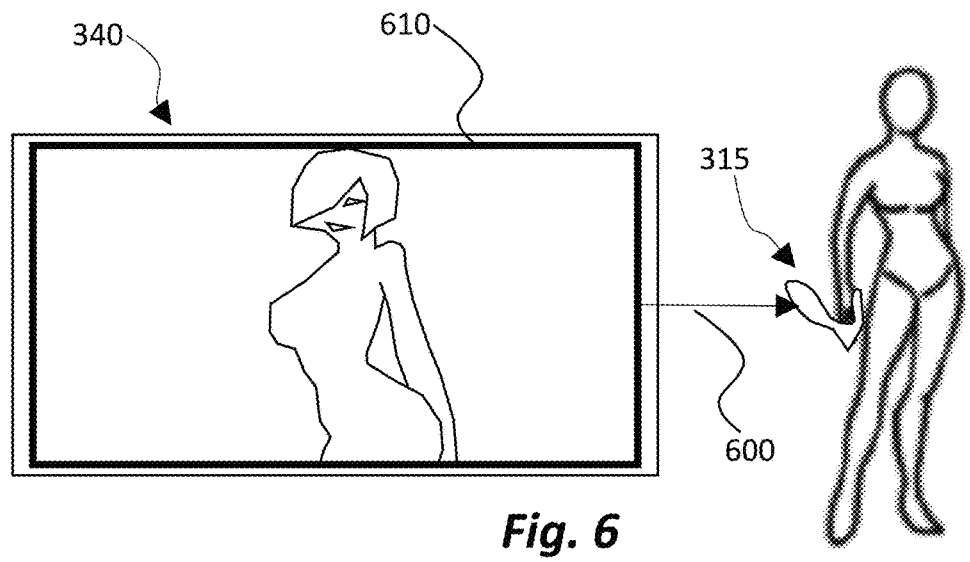
FIG. 6 is a schematic illustration of an exemplary embodiment of the exemplary disclosed system.

FIG. 6 illustrates an exemplary embodiment of system 300. In this exemplary embodiment, second application 420 may involve playing a video using a video device such as, for example, display system 340. Monitoring module 430 of first application 410 may be active (e.g., operating or turned on) to monitor second application 420, with first application 410 (e.g., and/or second application 420) including a video play module 610 (e.g., associated with a display device such as display system 340 and/or the exemplary disclosed user devices). For example, video play module 610 (e.g., of second application 420) may be operated to play a local video or online videos (e.g., in first application 410). Monitoring module 430 may thereby monitor a local video and/or online videos. Monitoring module 430 may monitor the exemplary disclosed multimedia information of the video. Identification module 440 may identify the exemplary disclosed sexual entertainment-related content in the exemplary disclosed multimedia information for example as described above. Generation module 450 may generate one or more control signals 600 according to the exemplary disclosed sexual entertainment-related content for example as described above. Transmission module 460 may transmit the one or more control signals 600 to the exemplary disclosed adult devices (e.g., one or more male accessories 308 and/or one or more female accessories 315) via the exemplary disclosed communication techniques for example as described above so that the exemplary disclosed adult devices are controlled based on the one or more control signals 600.

In at least some exemplary embodiments, second application 420 (e.g., including video play module 610) may be a functional module of first application 410, for example similar to how monitoring module 430 may be a functional module of first application 410. A user may open second application 420 (e.g., including video play module 610) within first application 410 and use second application 420 to play a video (e.g., and/or any other suitable media). For example, first application 410 may be configured to be integrated with second application 420. Also for example, first application 410 may be configured to run separately with second application 420 on a same exemplary disclosed device. For example in at least some exemplary embodiments, first application 410 may be configured to run separately with second application 420 on a same exemplary disclosed device or to be integrated with second application 420. Monitoring module 430 may monitor the exemplary disclosed multimedia information of second application 420 (e.g., including video play module 610) playing a video.

In at least some exemplary embodiments, second application 420 (e.g., including video play module 610) may be a third-party application that may be a different application from first application 410. For example, second application 420 (e.g., including video play module 610) may be an application provided by a system or source outside of system 300. When monitoring module 430 of first application 410 is running, a user may open second application 420 (e.g., including video play module 610) to play a video (e.g., and/or any other suitable media). Monitoring module 430 may monitor the exemplary disclosed multimedia information of second application 420 playing the video. For example, monitoring module 430 may monitor the exemplary disclosed multimedia information of second application 420 (e.g., including video play module 610) without involving prior integration with interfaces of second application 420 and/or pre-adaptation with second application 420, which may be a third-party application.

Figure 7:
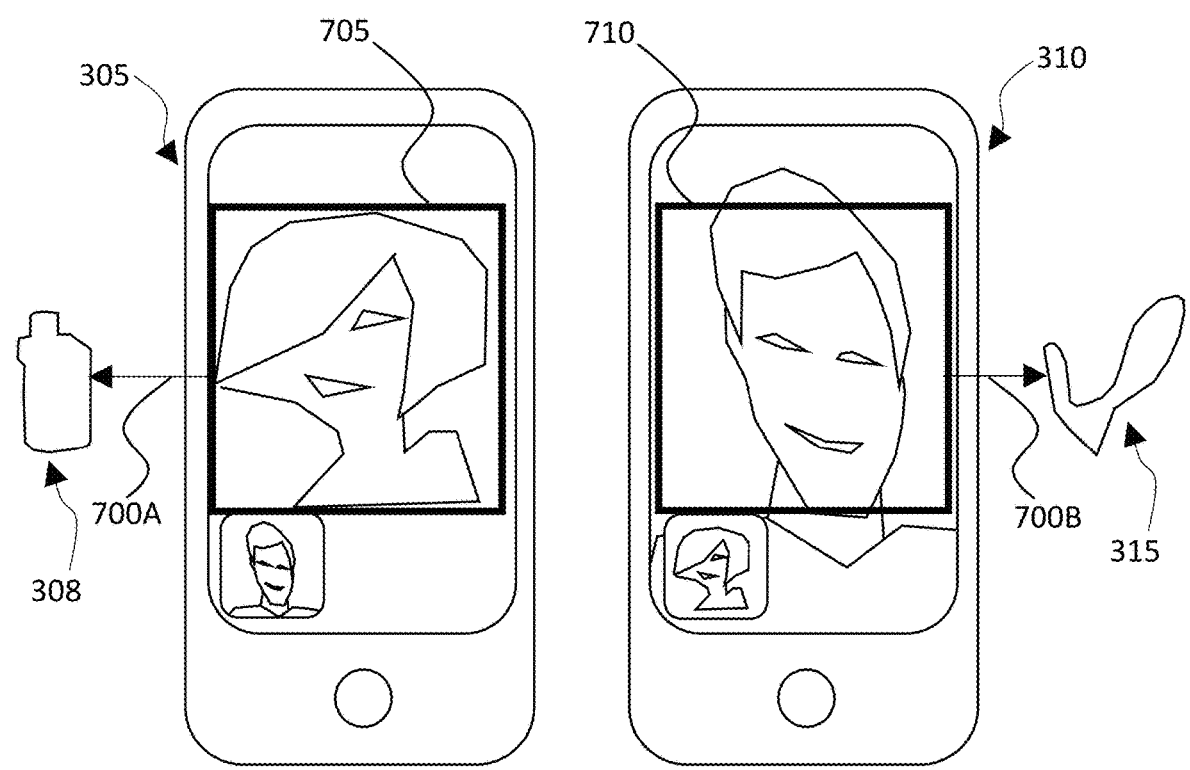
FIG. 7 is a schematic illustration of an exemplary embodiment of the exemplary disclosed system.

FIG. 7 illustrates another exemplary embodiment of system 300. In this exemplary embodiment, second application 420 may involve use of one or more of the exemplary disclosed user devices (e.g., one or more male user devices 305 and/or female user devices 310) and/or any other suitable device to take pictures and/or videos and/or to make video calls (e.g., including for example the exemplary disclosed chat described above regarding FIG. 3). Monitoring module 430 may be active (e.g., operating or turned) on in first application 410. A camera function of the exemplary disclosed user device may be active (e.g., operating or turned on) in first application 410 (e.g., or in second application 420) to take pictures and/or videos (e.g., shoot pictures and/or videos). Monitoring module 430 may thereby monitor the exemplary disclosed multimedia information, which may include the images and/or video (e.g., shooting pictures) and/or sound of the exemplary disclosed user devices. Identification module 440 may identify the exemplary disclosed sexual entertainment-related content in the exemplary disclosed multimedia information for example as described above. Generation module 450 may generate one or more control signals 700A and/or 700B according to the exemplary disclosed sexual entertainment-related content for example as described above. Transmission module 460 may transmit the one or more control signals 700A and/or 700B to the exemplary disclosed adult devices (e.g., one or more male accessories 308 and/or one or more female accessories 315) via the exemplary disclosed communication techniques for example as described above. The exemplary disclosed sexual entertainment-related content of multimedia information 705 of video of a first user (e.g., female user 325) may be transmitted from male user device 305 of a second user (e.g., male user 320) to male accessory 308 of that male user 320 to control male accessory 308 of that male user 320 to provide sexual stimulation to male user 320 based on characteristics of multimedia information 705. Also for example, the exemplary disclosed sexual entertainment-related content of multimedia information 710 of video of a second user (e.g., male user 320) may be transmitted from female user device 310 of a first user (e.g., female user 325) to female accessory 315 of that female user 325 to control female accessory 315 of that female user 325 to provide sexual stimulation to female user 325 based on characteristics of multimedia information 710.

Figure 8:
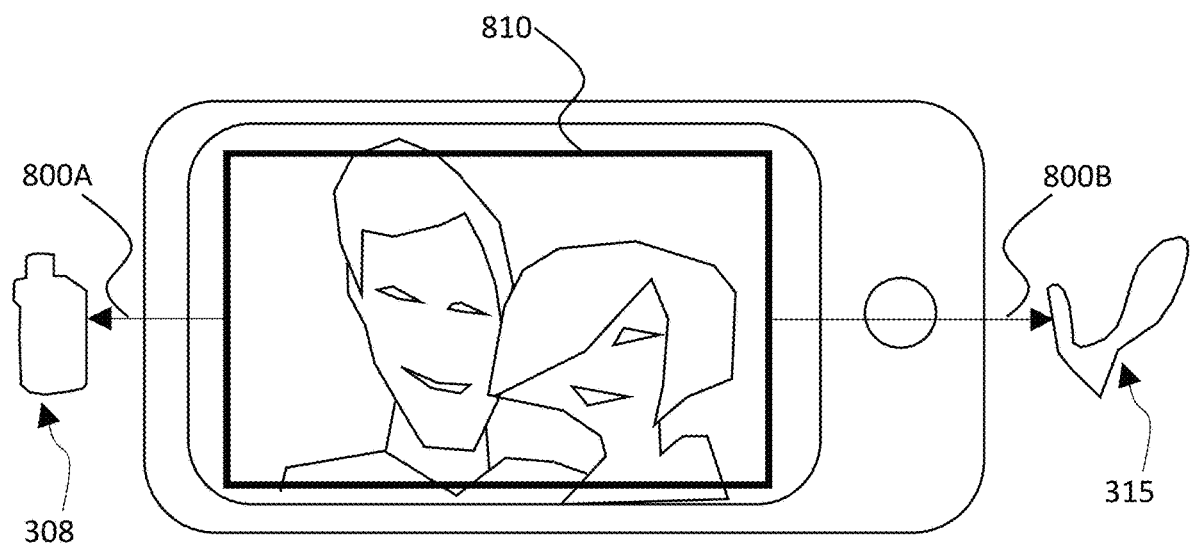
FIG. 8 is a schematic illustration of an exemplary embodiment of the exemplary disclosed system.

FIG. 8 illustrates another exemplary embodiment of system 300. In this exemplary embodiment, second application 420 may involve use of one or more of the exemplary disclosed user devices (e.g., one or more male user devices 305 and/or female user devices 310) and/or any other suitable device to take a picture and/or video using a camera of the device. Second application 420 may include camera app 810, which may be any suitable application and/or module for providing for capturing of images and/or video (e.g., including sound) by the exemplary disclosed user devices. In this case for example, first application 410 may include any suitable application for interactive, synchronous use of adult devices with media (e.g., VibeMate app from Lovense). Monitoring module 430 of first application 410 may be active (e.g., operating or turned on) to monitor second application 420, and second application 420 (e.g., including camera app 810) may be active (e.g., operating or turned on). Second application 420 may utilize (e.g., use data from, control, and/or invoke) a camera of the exemplary disclosed device (e.g., male user device 305 and/or female user device 310) to record images (e.g., capture video, pictures, and/or sound). Monitoring module 430 may monitor the exemplary disclosed multimedia information (e.g., video, pictures, and/or sound) captured by camera app 810. Identification module 440 may identify the exemplary disclosed sexual entertainment-related content in the exemplary disclosed multimedia information for example as described above. Generation module 450 may generate one or more control signals 800A and/or 800B according to the exemplary disclosed sexual entertainment-related content for example as described above. Transmission module 460 may transmit the one or more control signals 800A and/or 800B to the exemplary disclosed adult devices (e.g., one or more male accessories 308 and/or one or more female accessories 315) via the exemplary disclosed communication techniques for example as described above. For example, male accessory 308 may be controlled based on one or more control signals 800A, and female accessory 315 may be controlled based on one or more control signals 800B.

In at least some exemplary embodiments, second application 420 (e.g., including camera app 810) may be a functional module of first application 410, for example similar to how monitoring module 430 may be a functional module of first application 410. A user may open second application 420 (e.g., including camera app 810) within first application 410 and use second application 420 to take a picture and/or video. Monitoring module 430 may monitor the exemplary disclosed multimedia information of second application 420 (e.g., including camera app 810) playing the video.

In at least some exemplary embodiments, second application 420 (e.g., including camera app 810) may be a third-party application that may be a different application from first application 410. For example, second application 420 (e.g., including camera app 810) may be an application provided by a system or source outside of system 300. When monitoring module 430 of first application 410 is running, a user may open second application 420 (e.g., including camera app 810) to take a picture and/or video. Monitoring module 430 may monitor the exemplary disclosed multimedia information of second application 420 taking a picture and/or video. For example, monitoring module 430 may monitor the exemplary disclosed multimedia information of second application 420 (e.g., including camera app 810) without involving prior integration with interfaces of second application 420 and/or pre-adaptation with second application 420, which may be a third-party application.

In at least some exemplary embodiments, system 300 may control adult toys of different users according to selected monitored content of the exemplary disclosed multimedia information. For example, during a remote call, multiple users (e.g., a couple) may watch an adult video (e.g., as multimedia information) together. The man's actions in the video may control the woman's toys, and the woman's actions in the video may control the woman's toys, similar to for example as described above regarding FIG. 8.

Figure 9:
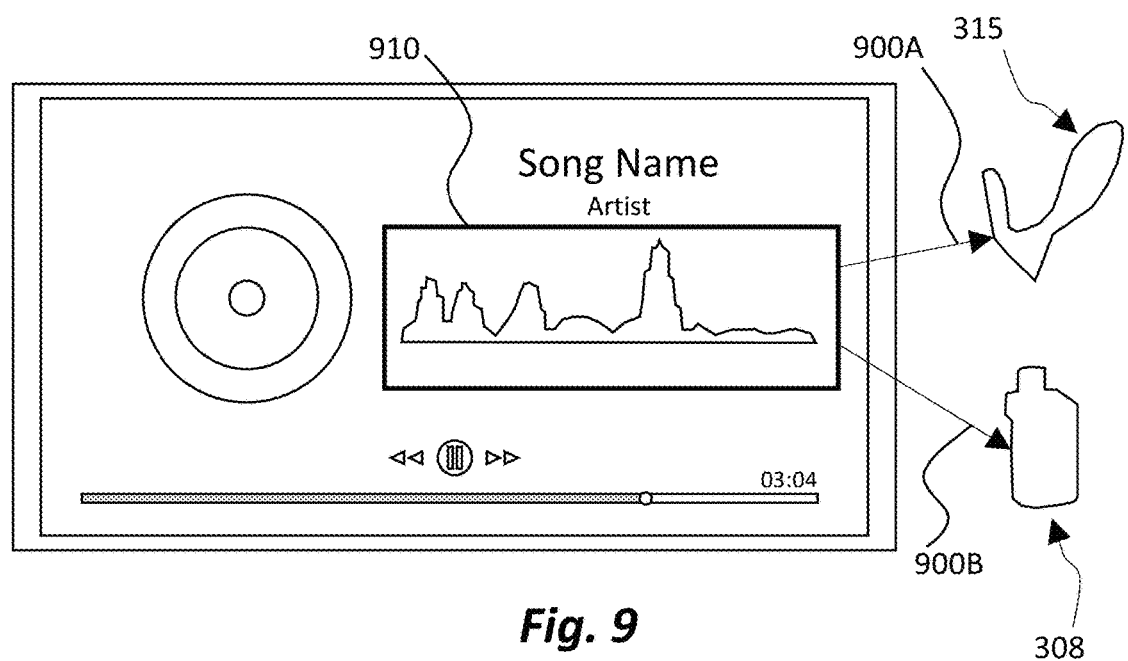
FIG. 9 is a schematic illustration of an exemplary embodiment of the exemplary disclosed system.

FIG. 9 illustrates another exemplary embodiment of system 300. In this exemplary embodiment, second application 420 may involve use of any suitable audio device such as, for example, audio system 345, one or more of the exemplary disclosed user devices (e.g., one or more male user devices 305 and/or female user devices 310), display system 340, and/or any other suitable device to play and/or record sound (e.g., music). Second application 420 may include a music app 910, which may be any suitable application and/or module for producing a music spectrum based on sound associated with the exemplary disclosed devices. The exemplary disclosed music spectrum may be a spectrum curve of sound or music such as, for example, a curve associated with a beat, tempo, volume, and/or any other suitable characteristics of music or sound of one or more of the exemplary disclosed devices. In this case for example, first application 410 may include any suitable application for interactive, synchronous use of adult devices with media (e.g., VibeMate app from Lovense). Monitoring module 430 of first application 410 may be active (e.g., operating or turned on) to monitor second application 420. For example, sound such as a song may be played using second application 420 (e.g., using one or more exemplary disclosed audio devices). Music app 910 may display the exemplary disclosed music spectrum for example as illustrated in FIG. 9. Monitoring module 430 may monitor the exemplary disclosed music spectrum of the exemplary disclosed multimedia information (e.g., of a song of music app 910). Monitoring module 430 may thereby monitor the exemplary disclosed multimedia information of the sound (e.g., music). Identification module 440 may identify the exemplary disclosed sexual entertainment-related content in the exemplary disclosed multimedia information for example as described above. Generation module 450 may generate one or more control signals 900A and/or 900B according to the exemplary disclosed sexual entertainment-related content for example as described above. Transmission module 460 may transmit the one or more control signals 900A and/or 900B to the exemplary disclosed adult devices (e.g., one or more male accessories 308 and/or one or more female accessories 315) via the exemplary disclosed communication techniques for example as described above. For example, female accessory 315 may be controlled based on one or more control signals 900A, and male accessory 308 may be controlled based on one or more control signals 900B.

In at least some exemplary embodiments, monitoring module 430 of first application 410 may use any suitable implementation method for monitoring the exemplary disclosed multimedia information provided by second application 420. Monitoring module 430 of first application 410 may monitor the exemplary disclosed multimedia information provided by second application 420 by recording or capturing information displayed on a screen of one or more of the exemplary disclosed devices (e.g., a screen of male user device 305, female user device 310, gaming system 335, display system 340, and/or any other device having a display screen). For example, if monitoring module 430 of first application 410 is active (e.g., operating or turned on), monitoring module 430 of first application 410 may record the screen of the exemplary disclosed device to monitor the exemplary disclosed multimedia information displayed on the device screen. For example, monitoring module 430 (e.g., and/or extraction module 470 described further below) may provide for extracting a frame from the exemplary disclosed multimedia information (e.g., recording video) based on a preset frequency (e.g., 50 ms/times or any other suitable frequency), and then generating a control signal based on the sexual entertainment-related content of the extracted information (e.g., extracted frames). Also for example, if monitoring module 430 of first application 410 is active (e.g., operating or turned on), monitoring module 430 of first application 410 may capture the screen of the exemplary disclosed device at a preset frequency (e.g., 100 ms/times or any other suitable frequency) to monitor the exemplary disclosed multimedia information displayed on the device screen of the exemplary disclosed device. In at least some exemplary embodiments, a video or screenshot recorded by first module 410 may be used to generate the exemplary disclosed one or more control signals and may not be stored (e.g., may not persistently, continuously, and/or permanently stored). For example, data of a video or screenshot (e.g., and/or other suitable media) recorded by first application 410 may be used in the cache to generate an exemplary disclosed control signal, and after a period of time, such data may be overwritten or cleared without being saved to the exemplary disclosed database. That is for example, in at least some exemplary embodiments, data recorded by first application 410 is used for a period of time for the purpose of generating one or more of the exemplary disclosed control signals, and then is overwritten or cleared without being saved.

Figure 10A:
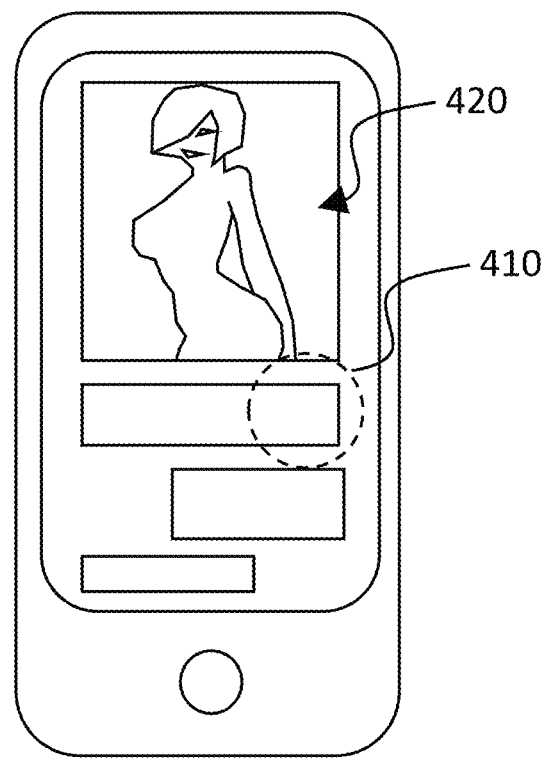
FIG. 10A is a schematic illustration of an exemplary embodiment of the exemplary disclosed system.
Figure 10B:
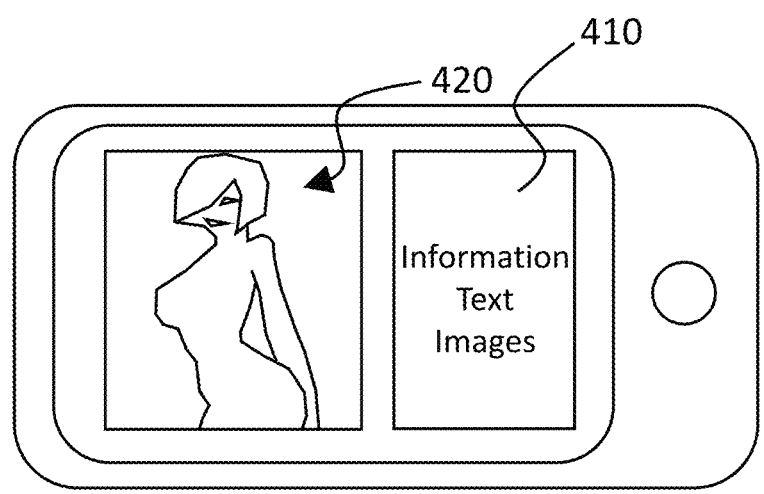
FIG. 10B is a schematic illustration of an exemplary embodiment of the exemplary disclosed system.

FIGS. 10A and 10B illustrate additional exemplary embodiments of system 300. In at least some exemplary embodiments and as illustrated in FIG. 10A, first application 410 may operate (e.g., run) in a background of the exemplary disclosed device (e.g., in the background of a display of the exemplary disclosed device). For example, first application 410 may remain silent and continuously running in a preset manner in the background of the exemplary disclosed device (e.g., male user device 305 or female user device 310). In at least some exemplary embodiments, an icon (e.g., any desired symbol or graphical element) may be displayed on an interactive interface (e.g., a screen display) of the exemplary disclosed device to indicate that first application 410 is running in a preset manner in the background of the exemplary disclosed device. Also in at least some exemplary embodiments, such an icon may not be displayed on an interactive interface (e.g., a screen display) of the exemplary disclosed device.

In at least some exemplary embodiments and as illustrated in FIG. 10B, first application 410 may be presented on an interactive interface (e.g., a screen display) of the exemplary disclosed device. For example, first application 410 may be displayed, including for example information, text, images, and/or any other suitable content or data. First application 410 may continuously operate (e.g., may keep running) without affecting visual effects of second application 420.

Figure 11A:
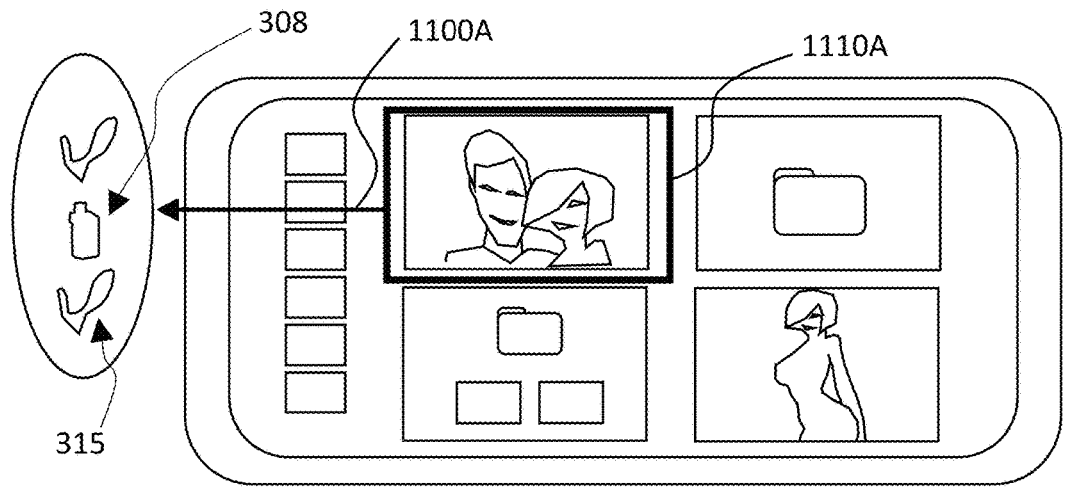
FIG. 11A is a schematic illustration of an exemplary embodiment of the exemplary disclosed system.
Figure 11B:
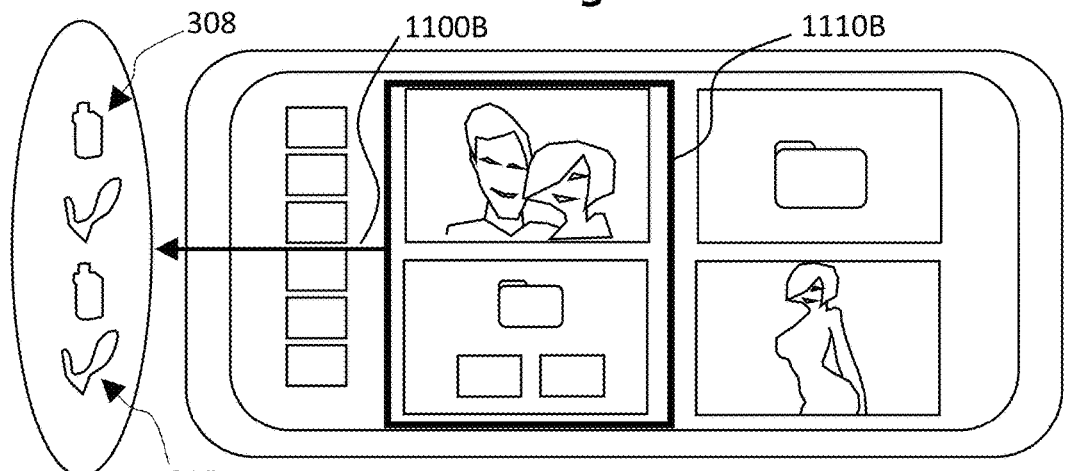
FIG. 11B is a schematic illustration of an exemplary embodiment of the exemplary disclosed system.
Figure 11C:
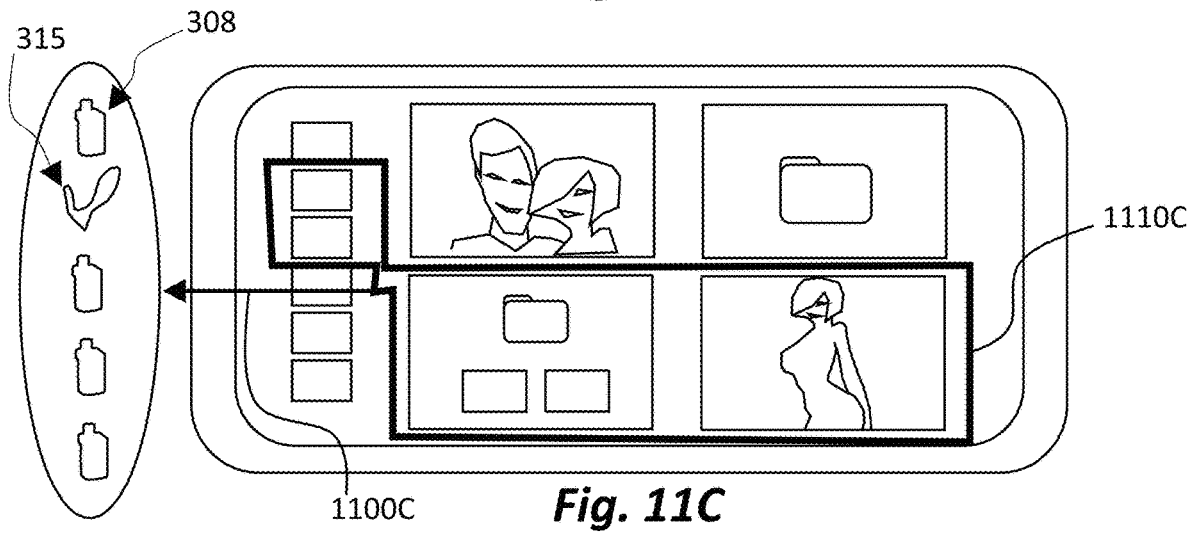
FIG. 11C is a schematic illustration of an exemplary embodiment of the exemplary disclosed system.

FIGS. 11A, 11B, and 11C illustrate additional exemplary embodiments of system 300. In at least some exemplary embodiments, monitoring module 430 may monitor a selected area of the exemplary disclosed device (e.g., of a display screen of the exemplary disclosed device). In at least some exemplary embodiments, the exemplary disclosed selected area may be an identification selection box as described below. The exemplary disclosed selected area may contain exemplary disclosed multimedia information provided by second application 420. The exemplary disclosed selected area may be a custom selection made by a user using the exemplary disclosed device. Also for example, the exemplary disclosed selected area may be an area including the exemplary disclosed sexual entertainment-related content, which may be determined by a preset model recognition (e.g., and/or identification module 440 for example as described above).

Monitoring module 430 (e.g., and/or identification module 440) may operate to provide an exemplary disclosed identification selection box (e.g., as further described below) on a display screen of the exemplary disclosed device, and may operate to provide adjusting of the properties of the identification selection box in response to a user's editing operation on the identification selection box (e.g., the user may click and drag, move, expand, reconfigure, and/or manipulate using any other suitable technique). Monitoring module 430 (e.g., and/or identification module 440) may determine the exemplary disclosed selected area on a display screen of the exemplary disclosed device based on the adjusted identification selection box (e.g., adjusted by the user as described above, adjusted based on an algorithm of the exemplary disclosed modules, adjusted based on artificial intelligence operations, and/or any other suitable adjustment).

In at least some exemplary embodiments, the exemplary disclosed selected area may be an area where second application 420 is displayed on a display screen of the exemplary disclosed device. For example, when second application 420 is selected for monitoring, the exemplary disclosed selected area may be an area in which second application 420 may be displayed on the display screen of the exemplary disclosed device. Monitoring module 430 may continuously monitor second application 420 at any location at which second application 420 may be located (e.g., on a display screen of the exemplary disclosed device). Monitoring module 430 may monitor the exemplary disclosed selected area (e.g., the one or more exemplary disclosed identification selection boxes), and may not monitor applications or content located outside of the exemplary disclosed selected area.

FIGS. 11A, 11B, and 11C illustrate exemplary embodiments of the exemplary disclosed selected area (e.g., exemplary disclosed identification selection boxes). As illustrated in FIG. 11A, an identification selection box 1110A (e.g., a box or rectangle) may contain multimedia information such as images or video (e.g., and/or an audio application or any other desired information) that may be monitored by monitoring module 430, and based on which the exemplary disclosed adult devices (e.g., one or more male accessories 308 and/or female accessories 315) may be controlled according to one or more control signals 1100A, for example similar to as described above. As illustrated in FIG. 11B, an identification selection box 1110B (e.g., an elongated box or rectangle) may contain multimedia information such as images or video (e.g., and/or an audio application or any other desired information) that may be monitored by monitoring module 430, and based on which the exemplary disclosed adult devices (e.g., one or more male accessories 308 and/or female accessories 315) may be controlled according to one or more control signals 1100B, for example similar to as described above. As illustrated in FIG. 11C, an identification selection box 1110C (e.g., a polygon of any desired shape) may contain multimedia information such as images or video (e.g., and/or an audio application or any other desired information) that may be monitored by monitoring module 430, and based on which the exemplary disclosed adult devices (e.g., one or more male accessories 308 and/or female accessories 315) may be controlled according to one or more control signals 1100C, for example similar to as described above.

In at least some exemplary embodiments and similar for example to as described below regarding the exemplary embodiment of FIG. 12, system 300 may control different users' toys according to the content at different locations of the multimedia information (e.g., at different exemplary disclosed identification selection boxes). For example, the content (e.g., sexual entertainment-related content) at different locations of the multimedia information may control the exemplary disclosed adult devices of different users differently (e.g., may control the different toys of different users differently from each other).

Figure 12:
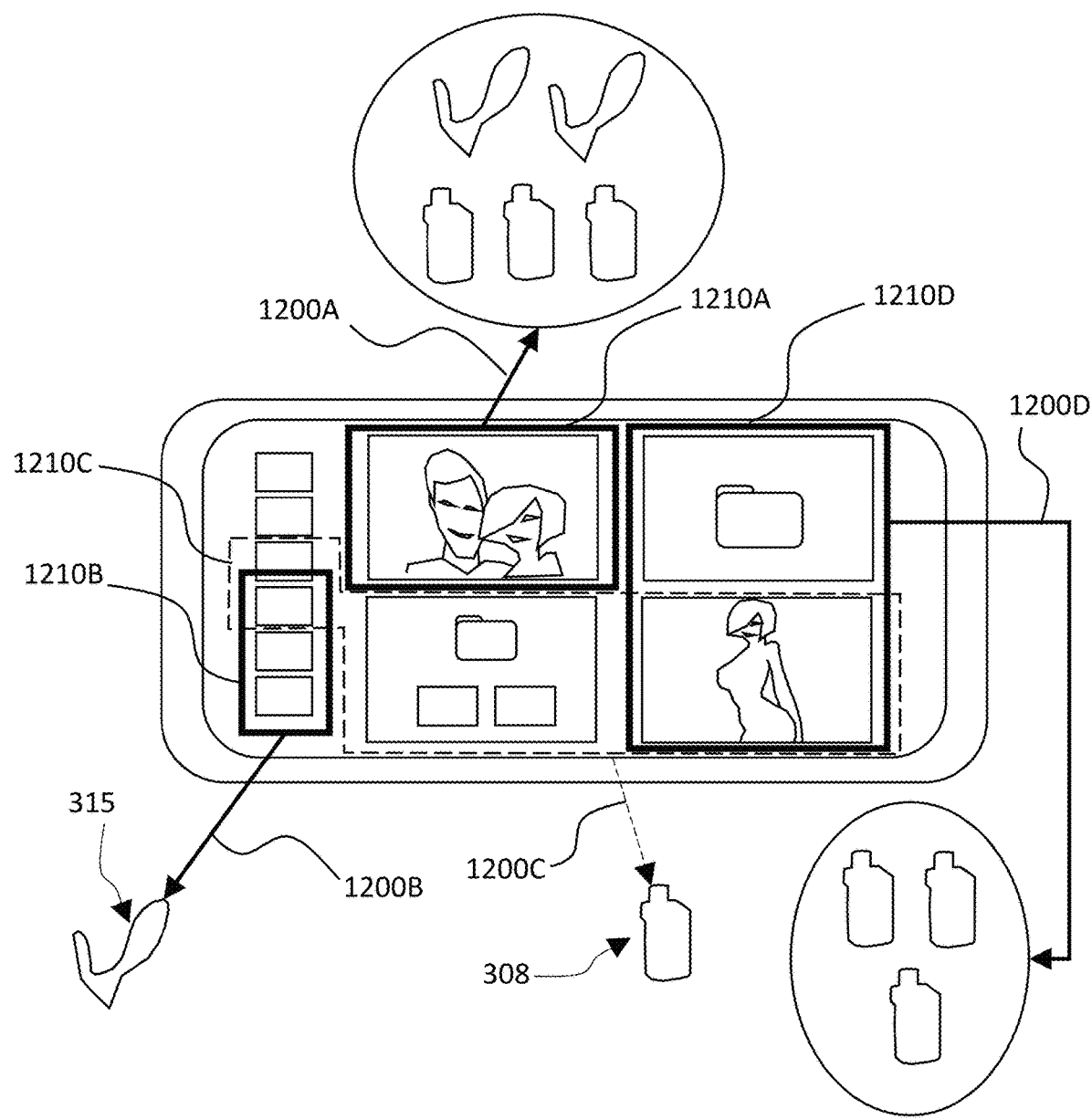
FIG. 12 is a schematic illustration of an exemplary embodiment of the exemplary disclosed system.

As illustrated in FIG. 12, a plurality of exemplary disclosed identification selection boxes of varying shapes may be used together (e.g., simultaneously). Different exemplary disclosed identification selection boxes may be used for controlling different exemplary disclosed adult devices (e.g., and/or different groups of exemplary disclosed adult devices). For example, similar to as described regarding FIGS. 11A through 11C above, one or more exemplary disclosed adult devices may be controlled according to one or more control signals 1200A based on monitoring module 430 monitoring multimedia information contained in an identification selection box 1210A. One or more exemplary disclosed adult devices may be controlled according to one or more control signals 1200B based on monitoring module 430 monitoring multimedia information contained in an identification selection box 1210B. One or more exemplary disclosed adult devices may be controlled according to one or more control signals 1200C based on monitoring module 430 monitoring multimedia information contained in an identification selection box 1210C. One or more exemplary disclosed adult devices may be controlled according to one or more control signals 1200D based on monitoring module 430 monitoring multimedia information contained in an identification selection box 1210D. The exemplary disclosed adult devices may be controlled differently based on the different exemplary disclosed control signals (e.g., control signals 1200A, 1200B, 1200C, and/or 1200D).

Figure 13:
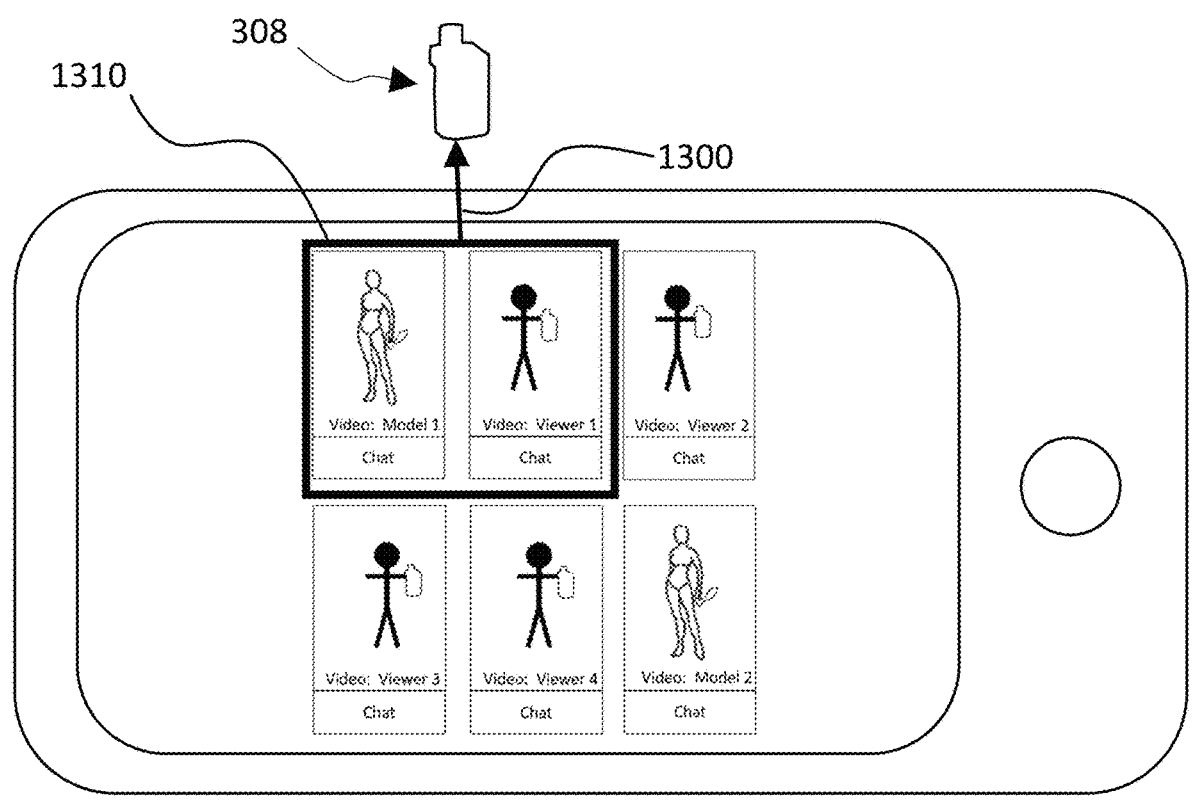
FIG. 13 is a schematic illustration of an exemplary embodiment of the exemplary disclosed system.

FIG. 13 illustrates another exemplary embodiment of system 300. Similar to as described above regarding FIGS. 11A through 11C, multimedia information corresponding to chat communication similar to as described above in FIG. 3 may be selected for monitoring by monitoring module 430. For example, one or more exemplary disclosed adult devices may be controlled according to one or more control signals 1300 based on monitoring module 430 monitoring multimedia information contained in an identification selection box 1310, which may include information associated with video, images, and/or sound associated with one or more users participating in the exemplary disclosed chat application.

In at least some exemplary embodiments, system 300 may operate to extract features of the exemplary disclosed sexual entertainment-related content (e.g., content related to sexual entertainment) using extraction module 470. Extraction module 470 may be similar to the exemplary disclosed modules described above and may be incorporated into generation module 450 (e.g., and/or identification module 440, monitoring module 430, and/or any other suitable modules described herein). The extracted features may include a person's body features, an object feature (e.g., of one or more of the exemplary disclosed adult devices that can provide sexual stimulation), a text feature, and/or any other desired feature (e.g., of the exemplary disclosed sexual entertainment-related content of the exemplary disclosed multimedia information). System 300 may generate the exemplary disclosed control signals according to the exemplary disclosed extracted features using generation module 450.

In at least some exemplary embodiments, the exemplary disclosed extracted features may be body features of a person. System 300 may track motion information of the body features of the person using extraction module 470 (e.g., and/or monitoring module 430 and/or identification module 440). System 300 may generate one or more exemplary disclosed control signals based on the motion information of the body features of the person using extraction module 470 (e.g., and/or generation module 450).

In at least some exemplary embodiments, the exemplary disclosed extracted features may be object features (e.g., of one or more of the exemplary disclosed adult devices such as male accessory 308 and/or female accessory 315). System 300 may track state information of the object features (e.g., location, shape, operation, and/or any other suitable characteristics) using extraction module 470 (e.g., and/or monitoring module 430 and/or identification module 440). System 300 may generate one or more exemplary disclosed control signals based on the state information of the object features using extraction module 470 (e.g., and/or generation module 450).

In at least some exemplary embodiments, the exemplary disclosed extracted features may be text features such as, for example, letters, words, numbers, symbols, and/or any other desired type of textual information. System 300 may track and parse the text features including, for example, semantics of the text features (e.g., meaning of the text features such as meaning of words, numbers, and/or symbols) using extraction module 470 (e.g., and/or monitoring module 430 and/or identification module 440). System 300 may generate one or more exemplary disclosed control signals based on the text features using extraction module 470 (e.g., and/or generation module 450).

In at least some exemplary embodiments, system 300 may operate to calculate motion characteristics of the exemplary disclosed sexual entertainment-related content (e.g., content related to sexual entertainment) using calculation module 480. Calculation module 480 may be similar to the exemplary disclosed modules described above and may be incorporated into generation module 450 (e.g., and/or identification module 440, monitoring module 430, and/or any other suitable modules described herein). For example, the exemplary disclosed motion characteristics may be calculated by system 300 (e.g., using calculation module 480 and/or any other suitable exemplary disclosed modules described herein) based on performing a differential operation on a plurality of frames (e.g., two or three frames) of content images of the exemplary disclosed multimedia information that may be sequential (e.g., continuous in time, for example being sequential frames). When an operation result determined using calculation module 480 and/or any other suitable exemplary disclosed modules described herein meets a preset threshold, system 300 may determine that the exemplary disclosed motion characteristics are present or exist (e.g., motion of a body, object, or other item is occurring). System 300 may generate one or more exemplary disclosed control signals based on the motion characteristics using calculation module 480 (e.g., and/or generation module 450). That is, in at least some exemplary embodiments, if it is confirmed by system 300 that there is object movement in the monitored multimedia information, one or more exemplary disclosed control signals may be generated as described above.

The exemplary disclosed system and method may be used in any suitable application for controlling electronic devices. The exemplary disclosed system and method may be used in any suitable application for controlling adult devices. For example, the exemplary disclosed system and method may be used in any suitable application for controlling adult devices based on multiple applications such as multiple sources of information (e.g., data). The exemplary disclosed system and method may be used in any suitable application for controlling devices based on full-scenario applications (e.g., multi-type application).

Figure 14:
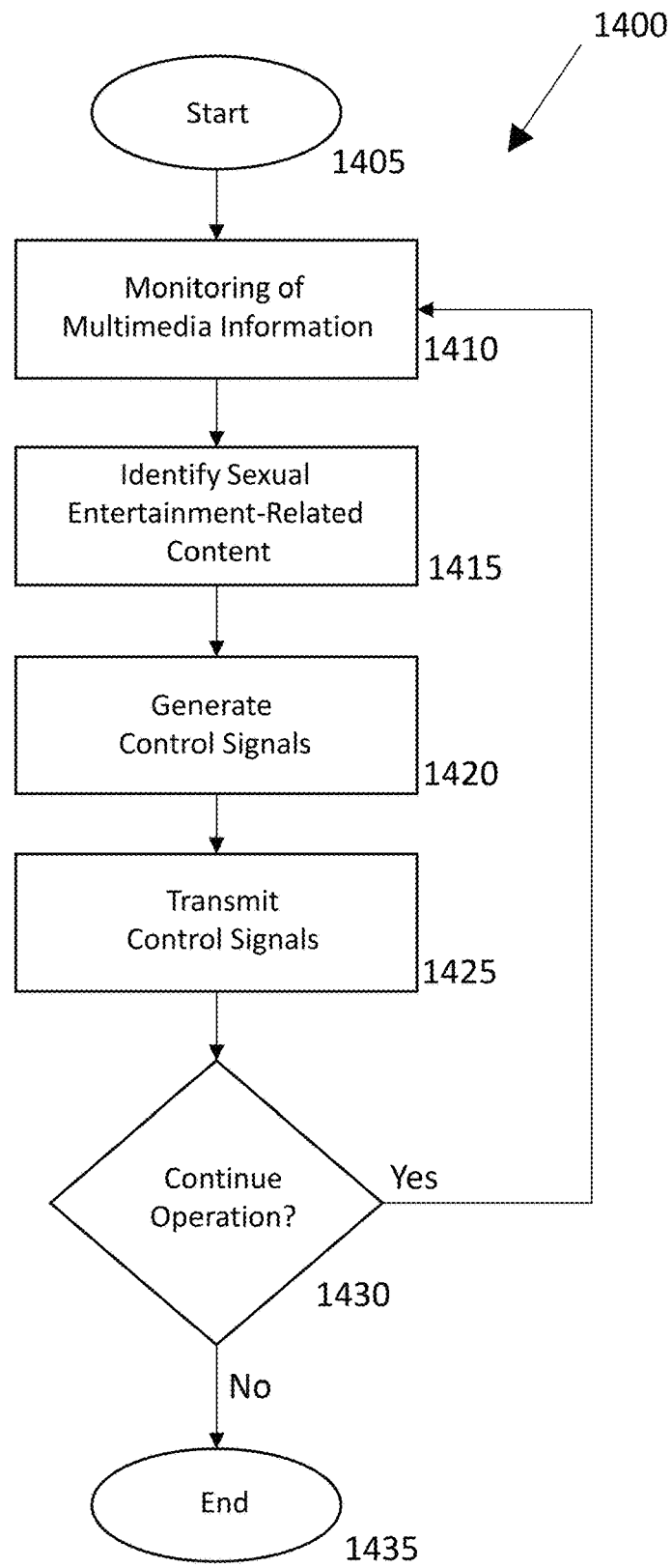
FIG. 14 is a flowchart showing an exemplary process of the present invention.

FIG. 14 illustrates an exemplary process for the operation of the exemplary disclosed system. Process 1400 begins at step 1405. At step 1410, monitoring module 430 may monitor the exemplary disclosed monitor multimedia information provided by one or more second applications 420 for example as described above. At step 1415, identification module 440 may identify the exemplary disclosed sexual entertainment-related content in the exemplary disclosed multimedia information for example as described above. In at least some exemplary embodiments, identification module 440 may identify the exemplary disclosed sexual entertainment-related content using the exemplary disclosed identification selection boxes described above.

At step 1420, generation module 450 may generate a control signal, for example as described above according to the exemplary disclosed sexual entertainment-related content identified at step 1415. System 300 may operate to extract features of the exemplary disclosed sexual entertainment-related content using extraction module 470 for example as described above. System 300 may operate to calculate motion characteristics of the exemplary disclosed sexual entertainment-related content using calculation module 480 for example as described above. At step 1425, transmission module 460 may transmit the exemplary disclosed control signals generated by generation module 450 at step 1420 to the exemplary disclosed adult devices for example as described above.

At step 1430, system 300 may determine whether or not operation is to be continued (e.g., based on user control or input, a predetermined time period elapsing, predetermined algorithms, artificial intelligence operations, and/or any other suitable criteria). If operation is to be continued, process 1400 may return to step 1410. As many iterations as desired of steps 1410 through 1430 may be performed. If operation is not to be continued, process 1400 ends at step 1435.

The invention includes other illustrative embodiments ("Embodiments") as follows.

Embodiment 1: A method, comprising: monitoring, by a monitoring module of a first application, multimedia information provided by at least one second application of multiple different types, wherein the multimedia information includes at least one of the multimedia information captured by a device, the multimedia information received by the device, and the multimedia information displayed on the device; wherein the at least one second application is configured to provide different types of sexual entertainment-related content; wherein the at least one second application includes at least one selected from the group of a video/audio playback type, a camera-shooting type, an audio-recording type, a game-play type, an instant communication type, or a web browsing type; identifying, by an identification module, the sexual entertainment-related content in the multimedia information; generating, by a generation module, a control signal according to the sexual entertainment-related content; and transmitting, by a transmission module of the first application, the control signal to a sexual stimulation device, wherein the first application is configured to run separately with the at least one second application on a same device or to be integrated with the at least one second application.

Embodiment 2: The method of Embodiment 1, wherein the monitoring module of the first application monitors the multimedia information provided by the second application by recording or capturing the screen of the device.

Embodiment 3: The method of Embodiment 2, wherein the monitoring of the multimedia information provided by the second application through the monitoring module of the first application includes: monitoring, by the monitoring module of the first application, a recording video containing at least a display area of the second application, so as to monitor the multimedia information provided by the second application.

Embodiment 4: The method of Embodiment 3, further comprising: extracting frames from the recording video based on a preset frequency; identifying, by the identification module, the sexual entertainment-related content in the extracted frames; generating, by the generation module, the control signal based on the sexual entertainment-related content in the extracted frames; and transmitting, by the transmission module of the first application, the control signal associated with the extracted frames to the sexual stimulation device.

Embodiment 5: The method of Embodiment 3, wherein the monitoring of the multimedia information provided by the second application through the monitoring module of the first application includes: monitoring, by the monitoring module of the first application, at least one image of the display area including the second application that is captured at a preset frequency, so as to monitor the multimedia information provided by the second application.

Embodiment 6: The method of Embodiment 1, wherein the first application runs in the background of the device and remains silent and continuously running in a preset manner.

Embodiment 7: The method of Embodiment 1, wherein the first application is presented on an interactive interface of the device and keeps running without affecting the visual effect of the second application.

Embodiment 8: The method of Embodiment 1, wherein the second application is an application configured to use data from a device camera of the device, the method further comprising: monitoring images captured by the device camera and used by the second application by using the monitoring module of the first application; identifying the sexual entertainment-related content in the multimedia information from the images captured by the device camera through the identification module; and generating the control signal according to the sexual entertainment-related content from the images captured by the device camera through the generation module.

Embodiment 9: The method of Embodiment 1, wherein the second application is configured to make video calls, the method further comprising: monitoring a video call screen of the second application through the monitoring module of the first application; identifying the sexual entertainment-related content in the video call screen through the identification module; and generating a control signal according to the sexual entertainment-related content in the video call screen through the generation module.

Embodiment 10: The method of Embodiment 1, further comprising: extracting features of the sexual entertainment-related content through an extraction module, wherein the features include at least one of a person's body features, object features of an adult device configured to provide sexual stimulation, or text features; and generating the control signal according to the extracted features through the generation module.

Embodiment 11: The method of Embodiment 10, wherein generating the control signal based on the extracted features includes: if the extracted features are the person's body features, tracking motion information of the person's body features, and generating the control signal based on the motion information of the person's body features; if the extracted features are the object features, tracking state information of the object features, and generating the control signal based on the state information of the object features; and if the extracted features are text features, parsing semantics of the text features, and generating the control signal based on the semantics of the text features.

Embodiment 12: The method of Embodiment 1, further comprising: calculating motion characteristics of the sexual entertainment-related content by a calculation module, wherein the motion characteristics are calculated by performing a differential operation on a plurality of frames of content images that are sequential; if an operation result meets a preset threshold, determining that the motion characteristics are present; and generating the control signal based on the motion characteristics by the generation module.

Embodiment 13: The method of Embodiment 1, further comprising: identifying the sexual entertainment-related content in the multimedia information and then determining at least one corresponding sexual stimulation device based on the identified content; generating the control signal for the at least one corresponding sexual stimulation device; and transmitting the control signal to the at least one corresponding sexual stimulation device.

Embodiment 14: The method of Embodiment 1, wherein monitoring the multimedia information provided by the second application through the monitoring module of the first application includes: monitoring a selected area on a display of the device through the monitoring module, wherein the selected area contains the multimedia information provided by the second application.

Embodiment 15: The method of Embodiment 14, further comprising: monitoring at least two selection areas on the display of the device as the selected area; configuring each of the at least two selection areas to be associated with at least one corresponding sexual stimulation device; generating the control signal for the at least one corresponding sexual stimulation device based on the content in the at least two selection areas; and transmitting the control signal to the corresponding sexual stimulation device.

Embodiment 16: The method of Embodiment 14, wherein the selected area is a custom selection made by a user on the display of the device, or the selected area is an area including the sexual entertainment-related content determined by a preset model recognition.

Embodiment 17: The method of Embodiment 14, further comprising: providing an identification selection box; adjusting the properties of the identification selection box in response to a user's editing operation on the identification selection box; and determining the selected area on the display of the device based on the adjusted identification selection box.

Embodiment 18: A system, comprising: a monitoring module, an identification module, a generation module, and a transmission module, the modules comprising computer-executable code stored in non-volatile memory; and a memory for storing instructions and a processor for executing the instructions; wherein the computer-executable code, when operating on the processor, causes the system to: monitor, by the monitoring module of a first application, multimedia information provided by at least one second application of multiple different types, wherein the multimedia information includes at least one of the multimedia information captured by a device, the multimedia information received by the device, and the multimedia information displayed on the device; wherein the at least one second application includes at least one selected from the group of a video/audio playback type, a camera-shooting type, an audio-recording type, a game-play type, an instant communication type, or a web browsing type; identify, by the identification module, the sexual entertainment-related content in the multimedia information; generate, by the generation module, a control signal according to the sexual entertainment-related content; and transmit, by the transmission module of the first application, the control signal to a sexual stimulation device, wherein the first application is configured to run separately with the at least one second application on a same device or to be integrated with the at least one second application.

Embodiment 19: The system of Embodiment 18, wherein the monitoring module of the first application monitors the multimedia information provided by the second application by recording or capturing the display of the device.

Embodiment 20: A non-transitory computer-readable storage medium, comprising: machine-readable instructions, the machine-readable instructions, when executed by a processor of a controller, cause the controller to: monitor, by a monitoring module of a first application, multimedia information provided by at least one second application of multiple different types, wherein the multimedia information includes at least one of the multimedia information captured by a device, the multimedia information received by the device, and the multimedia information displayed on the device; wherein the at least one second application is configured to provide different types of sexual entertainment-related content; wherein the at least one second application includes at least one selected from the group of a video/audio playback type, a camera-shooting type, an audio-recording type, a game-play type, an instant communication type, or a web browsing type; identify, by an identification module, the sexual entertainment-related content in the multimedia information; generate, by a generation module, a control signal according to the sexual entertainment-related content; and transmit, by a transmission module of the first application, the control signal to a sexual stimulation device, wherein the first application is configured to run separately with the at least one second application on a same device or to be integrated with the at least one second application.

The exemplary disclosed system and method may provide an efficient and effective technique for controlling adult devices (e.g., utilizing AI to control adult devices) based on multiple sources such as, for example, multiple applications and other exemplary disclosed information and data sources. The exemplary disclosed system and method may provide an efficient and effective technique for controlling adult devices based on full-scenario (e.g., multi-type) artificial intelligence operations. For example, the exemplary disclosed system and method may provide for simultaneously controlling one or more adult devices based on a plurality of different applications. The exemplary disclosed system and method may also provide a relatively simple technique for implementing AI functions.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 15:
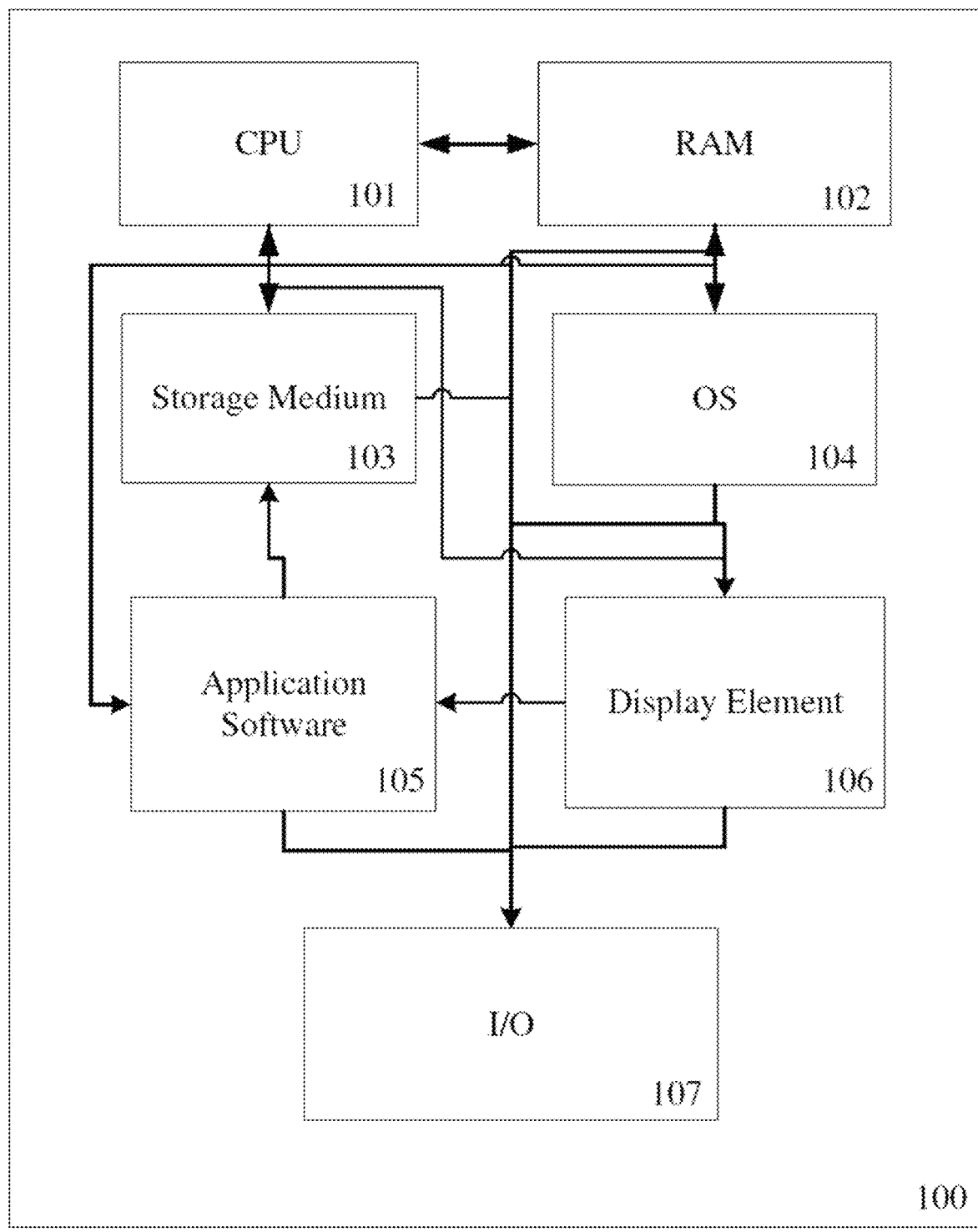
FIG. 15 is a schematic illustration of an exemplary computing device, in accordance with at least some exemplary embodiments of the present disclosure.

An illustrative representation of a computing device appropriate for use with embodiments of the system of the present disclosure is shown in FIG. 15. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 16, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 16:
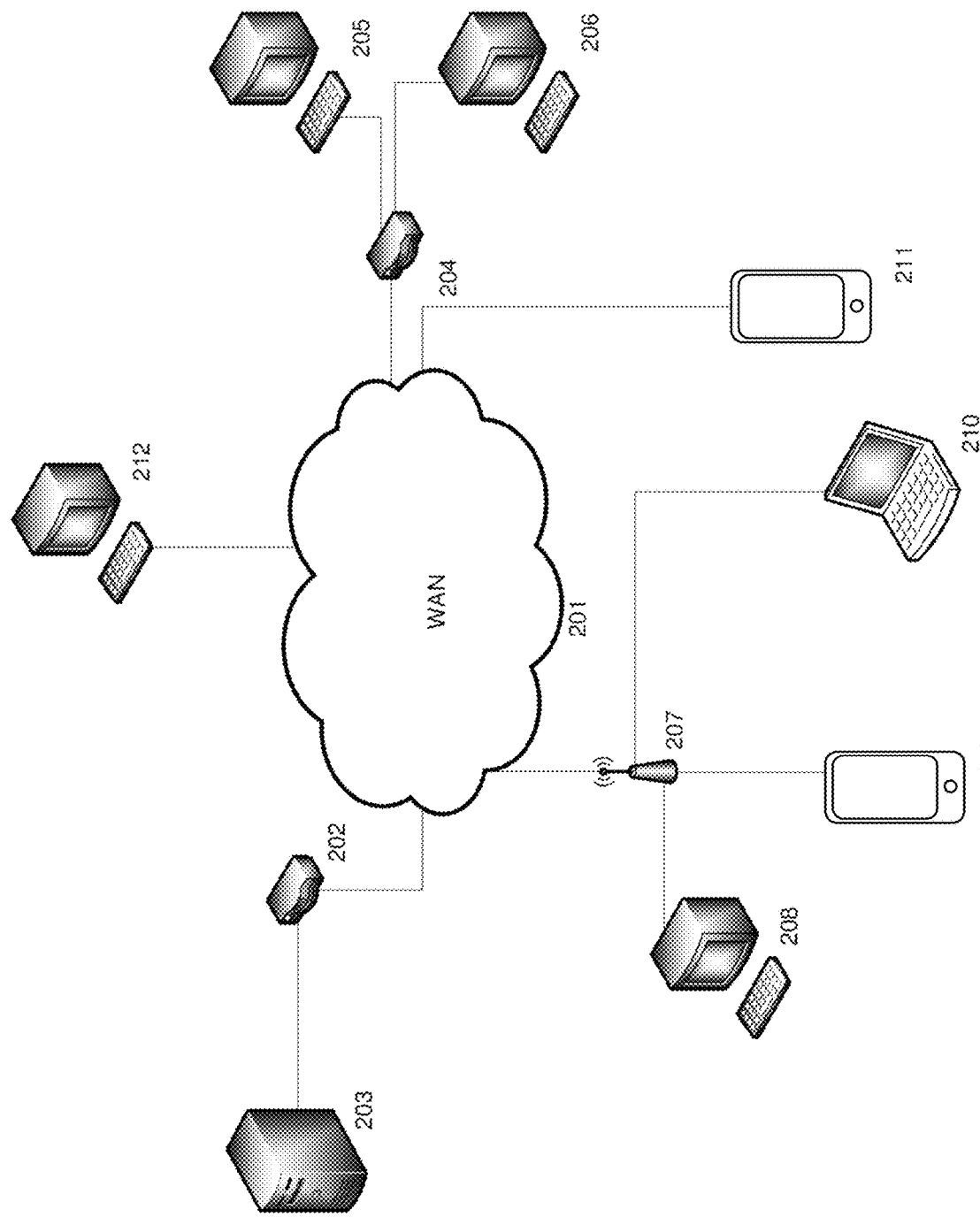
FIG. 16 is a schematic illustration of an exemplary network, in accordance with at least some exemplary embodiments of the present disclosure.

Referring to FIG. 16, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 16, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
monitoring, by a monitoring module of a first application, multimedia information provided by at least one second application, wherein the multimedia information includes at least one of the multimedia information captured by a device, the multimedia information received by the device, and the multimedia information displayed on a display of the device;

identifying, by an identification module of the first application, sexual entertainment-related content in the multimedia information provided by the at least one second application in real-time or near real-time;

wherein a type of the at least one second application includes at least one selected from the group of a video/audio playback type, a camera-shooting type, an audio-recording type, a game-play type, an instant communication type, or a web browsing type;

generating, by a generation module of the first application, a control signal according to the sexual entertainment-related content in real-time or near real-time; and transmitting, by a transmission module of the first application, the control signal to a sexual stimulation device, wherein the first application is either configured to run separately with the at least one second application on the device or to be integrated with the at least one second application based on either:

the at least one second application displaying the multimedia information via the display of the device while the first application is concealed from the display or viewed on the display simultaneously with the at least one second application and the first application monitors the multimedia information displayed by the at least one second application and generates the control signal in real-time or near real-time, or the at least one second application displaying images captured by a device camera of the device while the first application monitors the multimedia information displayed by the at least one second application and generates the control signal in real-time or near real-time.

2. The method of claim 1, wherein the monitoring module of the first application monitors the multimedia information provided by the at least one second application by recording or capturing a screen of the device.

3. The method of claim 2, wherein the monitoring of the multimedia information provided by the at least one second application through the monitoring module of the first application includes:

monitoring, by the monitoring module of the first application, a recording video displayed in at least a display area of the at least one second application, so as to monitor the multimedia information provided by the at least one second application.

4. The method of claim 3, further comprising:

extracting frames from the recording video based on a preset frequency;

identifying, by the identification module, the sexual entertainment-related content in the extracted frames;

generating, by the generation module, the control signal based on the sexual entertainment-related content in the extracted frames; and transmitting, by the transmission module of the first application, the control signal associated with the extracted frames to the sexual stimulation device.

5. The method of claim 3, wherein the monitoring of the multimedia information provided by the at least one second application through the monitoring module of the first application includes:

monitoring, by the monitoring module of the first application, a plurality of images of the display area including the at least one second application that is captured at a preset frequency, so as to monitor the multimedia information provided by the at least one second application.

6. The method of claim 1, wherein the first application runs in the background of the device and remains silent and continuously running in a preset manner.

7. The method of claim 1, wherein the first application is presented on an interactive interface of the device and keeps running without affecting the visual effect of the at least one second application.

8. The method of claim 1, wherein the at least one second application is an application configured to use data from the device camera of the device, the method further comprising:

monitoring the images captured by the device camera and used by the at least one second application by using the monitoring module of the first application;

identifying the sexual entertainment-related content in the multimedia information from the images captured by the device camera through the identification module; and generating the control signal according to the sexual entertainment-related content from the images captured by the device camera through the generation module.

9. The method of claim 1, wherein the at least one second application is configured to make video calls, the method further comprising:

monitoring a video call screen of the at least one second application through the monitoring module of the first application;

identifying the sexual entertainment-related content in the video call screen through the identification module; and generating the control signal according to the sexual entertainment-related content in the video call screen through the generation module.

10. The method of claim 1, further comprising:

extracting features of the sexual entertainment-related content through an extraction module, wherein the features include at least one of a person's body features, object features of the sexual stimulation device configured to provide sexual stimulation, or text features; and generating the control signal according to the extracted features through the generation module.

11. The method of claim 10, wherein generating the control signal based on the extracted features includes:

if the extracted features are the person's body features, tracking motion information of the person's body features, and generating the control signal based on the motion information of the person's body features;

if the extracted features are the object features, tracking state information of the object features, and generating the control signal based on the state information of the object features; and if the extracted features are text features, parsing semantics of the text features, and generating the control signal based on the semantics of the text features.

12. The method of claim 1, further comprising:

calculating motion characteristics of the sexual entertainment-related content by a calculation module, wherein the motion characteristics are calculated by performing a differential operation on a plurality of frames of content images that are sequential;

if an operation result meets a preset threshold, determining that the motion characteristics are present; and generating the control signal based on the motion characteristics by the generation module.

13. The method of claim 1, further comprising:
identifying the sexual entertainment-related content in the multimedia information and then determining at least one corresponding sexual stimulation device from a plurality of sexual stimulation devices including the sexual stimulation device based on the identified content;
generating the control signal for the at least one corresponding sexual stimulation device; and
transmitting the control signal to the at least one corresponding sexual stimulation device.

14. The method of claim 1, wherein monitoring the multimedia information provided by the at least one second application through the monitoring module of the first application includes:
monitoring a selected area on the display of the device through the monitoring module, wherein the selected area contains the multimedia information provided by the at least one second application.

15. The method of claim 14, further comprising:
monitoring at least two selection areas on the display of the device as the selected area;
configuring each of the at least two selection areas to be associated with at least one corresponding sexual stimulation device of a plurality of sexual stimulation devices including the sexual stimulation device;
generating the control signal for the at least one corresponding sexual stimulation device based on the content in the at least two selection areas; and
transmitting the control signal to the at least one corresponding sexual stimulation device.

16. The method of claim 14, wherein the selected area is a custom selection made by a user on the display of the device, or the selected area is an area including the sexual entertainment-related content determined by a preset model recognition.

17. The method of claim 14, further comprising:
providing an identification selection box;
adjusting the properties of the identification selection box in response to a user's editing operation on the identification selection box; and
determining the selected area on the display of the device based on the adjusted identification selection box.

18. The method of claim 1, wherein the at least one second application is an independent application, from the first application, of the at least one selected from the group of the video/audio playback type, the camera-shooting type, the audio-recording type, the game-play type, the instant communication type, or the web browsing type, the method further comprising:
determining, by the first application, the at least one second application as a target to be monitored.

19. The method of claim 1, wherein the at least one second application is an application configured to utilize a device camera module of the device, the method further comprising:
monitoring, by the monitoring module of the first application, the images;
identifying, by the identification module of the first application, the sexual entertainment-related content in the multimedia information from the images; and
generating, by the generation module of the first application, the control signal according to the sexual entertainment-related content from the images.

20. A system, comprising:
a monitoring module, an identification module, a generation module, and a transmission module, the modules comprising computer-executable code stored in non-volatile memory; and
a memory for storing instructions and a processor for executing the instructions;
wherein the computer-executable code, when operating on the processor, causes the system to:
monitor, by the monitoring module of a first application, multimedia information provided by at least one second application, wherein the multimedia information includes at least one of the multimedia information captured by a device, the multimedia information received by the device, and the multimedia information displayed on a display of the device;
identify, by the identification module of the first application, sexual entertainment-related content in the multimedia information provided by the at least one second application in real-time or near real-time;
wherein a type of the at least one second application includes at least one selected from the group of a video/audio playback type, a camera-shooting type, an audio-recording type, a game-play type, an instant communication type, or a web browsing type;
generate, by the generation module of the first application, a control signal according to the sexual entertainment-related content in real-time or near real-time; and
transmit, by the transmission module of the first application, the control signal to a sexual stimulation device,
wherein the first application is either configured to run separately with the at least one second application on the device or to be integrated with the at least one second application based on either:
the at least one second application displaying the multimedia information via the display of the device while the first application is concealed from the display or viewed on the display simultaneously with the at least one second application and the first application monitors the multimedia information displayed by the at least one second application and generates the control signal in real-time or near real-time, or
the at least one second application displaying images captured by a device camera of the device while the first application monitors the multimedia information displayed by the at least one second application and generates the control signal in real-time or near real-time.

21. The system of claim 20, wherein the monitoring module of the first application monitors the multimedia information provided by the at least one second application by recording or capturing the display of the device.

22. A non-transitory computer-readable storage medium, comprising:
machine-readable instructions,
the machine-readable instructions, when executed by a processor of a controller, cause the controller to:
monitor, by a monitoring module of a first application, multimedia information provided by at least one second application, wherein the multimedia information includes at least one of the multimedia information captured by a device, the multimedia information received by the device, and the multimedia information displayed on a display of the device;

identify, by an identification module of the first application, sexual entertainment-related content in the multimedia information provided by the at least one second application in real-time or near real-time;
wherein a type of the at least one second application includes at least one selected from the group of a video/audio playback type, a camera-shooting type, an audio-recording type, a game-play type, an instant communication type, or a web browsing type;
generate, by a generation module of the first application, a control signal according to the sexual entertainment-related content in real-time or near real-time; and
transmit, by a transmission module of the first application, the control signal to a sexual stimulation device,
wherein the first application is either configured to run separately with the at least one second application on the device or to be integrated with the at least one second application based on either:
the at least one second application displaying the multimedia information via the display of the device while the first application is concealed from the display or viewed on the display simultaneously with the at least one second application and the first application monitors the multimedia information displayed by the at least one second application and generates the control signal in real-time or near real-time, or
the at least one second application displaying images captured by a device camera of the device while the first application monitors the multimedia information displayed by the at least one second application and generates the control signal in real-time or near real-time.

* * * * *